US009223537B2

(12) United States Patent
Brown et al.

(10) Patent No.: US 9,223,537 B2
(45) Date of Patent: Dec. 29, 2015

(54) CONVERSATION USER INTERFACE

(75) Inventors: Fred A Brown, Colbert, WA (US);
Tanya M Miller, Colbert, WA (US);
Charles C Wooters, Spokane, WA (US);
Bryan Michael Culley, Spokane, WA (US); Eli D. Snavely, Spokane, WA (US)

(73) Assignee: Next IT Corporation, Spokane, WA (US)

( * ) Notice: Subject to any disclaimer, the term of this patent is extended or adjusted under 35 U.S.C. 154(b) by 519 days.

(21) Appl. No.: 13/449,927

(22) Filed: Apr. 18, 2012

(65) Prior Publication Data

US 2013/0283168 A1    Oct. 24, 2013

(51) Int. Cl.
*G06F 3/16*    (2006.01)

(52) U.S. Cl.
CPC ...................... *G06F 3/165* (2013.01)

(58) Field of Classification Search
CPC .... G06Q 10/02; G10L 15/22; G10L 15/1822; G10L 13/00; G10L 13/043; G10L 15/265; G06F 2203/0381; G06F 3/04842; G06F 3/167; G06F 17/30654; G06F 17/30734
USPC ......................................................... 715/728
See application file for complete search history.

(56) References Cited

U.S. PATENT DOCUMENTS

| 8,677,377 | B2 | 3/2014 | Cheyer et al. | |
|---|---|---|---|---|
| 2008/0235604 | A1* | 9/2008 | Ebert | 715/763 |
| 2009/0030800 | A1* | 1/2009 | Grois | 705/14 |
| 2009/0089100 | A1 | 4/2009 | Nenov et al. | |
| 2009/0216691 | A1* | 8/2009 | Borzestowski et al. | 706/11 |
| 2010/0005122 | A1* | 1/2010 | Jackson | 707/104.1 |
| 2010/0070871 | A1* | 3/2010 | Liesche et al. | 715/744 |
| 2010/0235808 | A1* | 9/2010 | Dayan et al. | 717/104 |
| 2010/0281012 | A1* | 11/2010 | Imig et al. | 707/708 |
| 2012/0016678 | A1* | 1/2012 | Gruber et al. | 704/275 |
| 2012/0022872 | A1* | 1/2012 | Gruber et al. | 704/270.1 |
| 2012/0030553 | A1* | 2/2012 | Delpha et al. | 715/205 |
| 2012/0245926 | A1 | 9/2012 | Montyne et al. | |
| 2012/0265528 | A1* | 10/2012 | Gruber et al. | 704/235 |

(Continued)

OTHER PUBLICATIONS

Office Action for U.S. Appl. No. 14/446,153, mailed on Sep. 26, 2014, Fred A. Brown, "Conversational Virtual Healthcare Assistant", 7 pages.

(Continued)

*Primary Examiner* — Andres E Gutierrez
(74) *Attorney, Agent, or Firm* — Lee & Hayes, PLLC

(57) ABSTRACT

A conversation user interface enables users to better understand their interactions with computing devices, particularly when speech input is involved. The conversation user interface conveys a visual representation of a conversation between the computing device, or virtual assistant thereon, and a user. The conversation user interface presents a series of dialog representations that show input from a user (verbal or otherwise) and responses from the device or virtual assistant. Associated with one or more of the dialog representations are one or more graphical elements to convey assumptions made to interpret the user input and derive an associated response. The conversation user interface enables the user to see the assumptions upon which the response was based, and to optionally change the assumption(s). Upon change of an assumption, the conversation GUI is refreshed to present a modified dialog representation of a new response derived from the altered set of assumptions.

47 Claims, 17 Drawing Sheets

(56) References Cited

U.S. PATENT DOCUMENTS

| | | | |
|---|---|---|---|
| 2013/0152092 A1* | 6/2013 | Yadgar | 718/102 |
| 2013/0262467 A1* | 10/2013 | Zhang et al. | 707/737 |
| 2014/0074454 A1 | 3/2014 | Brown et al. | |
| 2014/0337048 A1 | 11/2014 | Brown et al. | |

OTHER PUBLICATIONS

Final Office Action for U.S. Appl. No. 14/446,153, mailed on Apr. 29, 2015, Fred A. Brown, "Conversational Virtual Healthcare Assistant", 9 pages.

* cited by examiner

CONVERSATION USER INTERFACE

BACKGROUND

A large and growing population of users accesses information via websites or downloaded client applications provided by respective service providers. Accessing this information "online", rather than in person or over the phone, provides numerous benefits to both the service providers and the end users. For instance, the service providers are able to offer an array of information on their websites for access by end users at any time of day and without the cost associated with providing a human representative to help end users seek desired information. In many instances, this information may be of the type that a human representative of the service provider need not spend time relaying to customers, such as contact information of the service provider (e.g., physical location, phone number, etc.), hours in which the service provider is open, items (e.g., products, services, etc.) offered by the service provider, and the like.

While providing this type of information to end users in this manner is both convenient for users and saves costs for a service provider, the amount of available information can be overwhelming from both a management and an accessibility standpoint. For instance, a user may visit a website of a service provider to seek a particular piece of information or to make a particular request to the service provider. However, because of the massive amount of content and navigation paths offered by the website, the user may find that the desired information is akin to the proverbial needle in the haystack. As such, the user may get frustrated and cease working with the service provider or may call a human representative of the service provider for help, thus eliminating the cost savings associated with providing this information on the website.

To alleviate this problem, service providers may employ a "virtual assistant" to act as an interface between end users and the information on the service provider site. In some instances, this virtual assistant embodies a human representative of the service provider that is displayed on a website, client application, or the like of the service provider. The virtual assistant may also include an interface (e.g., a text box) that allows users to input queries, such as "where are you located?" or "when are you open?" In response to receiving such a query, the service provider or a third party utilizes natural language processing techniques to attempt to identify the contents of the user's query. After identifying these contents, the service provider or the third party identifies a response to provide to the user via the virtual assistant, such as "we are located at 555 N. 5$^{th}$ Street" or "we are open from 9 am to 7 pm today".

Virtual assistants thus act as an effective interface that allows users to seek information they desire while still allowing service providers to realize cost savings associated with providing information online rather than via a human representative. While these virtual assistants are helpful to both end users and service providers, increasing the ability of these virtual assistants to emulate human representatives remains a priority.

Another trend concerns the expanding use of mobile devices, such as smart phones, portable digital assistants, and tablets, to offer a wide variety of functionality. Users are accustomed to using their mobile devices to make phone calls, send emails, surf the web, find entertainment or eating establishments, use as a GPS navigation unit in finding locations, and so on.

As users engage computing devices for an ever growing diversity of functions, there has been a growing need to improve the way users interact with the devices. Traditional techniques of keyboards and keypads are being replaced or supplemented by touch interfaces. Further, there is a growing desire to verbally interact with computing devices.

With these technology advances, however, user expectations increase. Being able to simply speak commands to a computing device was once impressive; today, this is commonplace and expected. Where users were once satisfied with one word commands or simple phrases, users are demanding better experiences with smarter devices that understand more.

Accordingly, there is a continuing need for better ways to facilitate user interaction with a computing device, particularly in the mobile space where keyboard-based input is limited and voice interaction is increasing in popularity.

SUMMARY

This document describes, in part, techniques for facilitating user interaction with a computing device. More particularly, the techniques described herein provide for a conversation graphical user interface (GUI) that enables users to better understand their interactions with computing devices, particularly when speech input is involved.

In one example, the conversation GUI conveys a visual representation of a conversation between the computing device, or a virtual assistant thereon, and the user. The conversation GUI presents a series of dialog representations, such as dialog bubbles, which include user-originated dialog representations associated with input from a user (verbal or otherwise) and device-originated dialog representations associated with response from the device or virtual assistant. Associated with one or more of the dialog representations are one or more graphical elements to convey assumptions made to interpret the user input and derive an associated response. The conversation GUI enables the user to see the assumptions upon which the response was based, and to optionally change the assumption(s). Upon change of an assumption, the conversation GUI is refreshed to present a modified dialog representation of a new response derived from the altered set of assumptions.

In this way, the user can intuitively understand why the computing device responded as it did. For instance, by revealing the assumptions, the user can quickly learn whether the device misunderstood the verbal input (i.e., potentially a speech recognition issue) or whether the device misinterpreted the verbal input (i.e., potentially a natural language process issue).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to apparatus(es), system(s), method(s), computer-readable instructions, module(s), algorithms, and/or the like as permitted by the context above and throughout the document.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
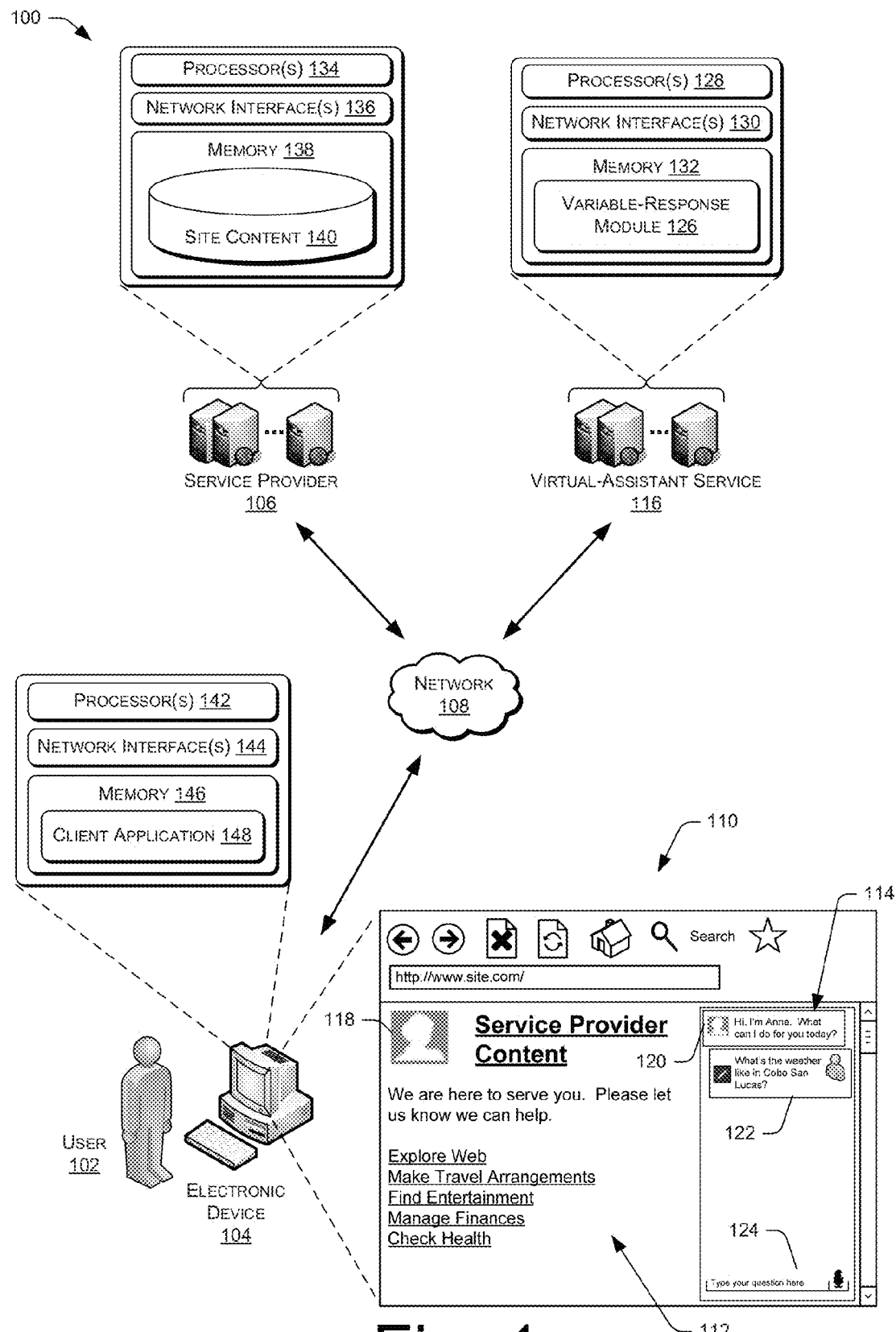
FIG. 1 illustrates an example architecture that includes a user operating an electronic device to render content from a site of a service provider (e.g., a website, a client application, etc.). The architecture also includes a virtual-assistant service that provides a virtual assistant for rendering on or adjacent to the site of the service provider, with this virtual assistant configured to provide variable responses to user inputs. The virtual-assistant service provides a conversation graphical user interface (GUI) that tracks a dialog exchange between the user and the virtual assistant.

This disclosure describes techniques for facilitating user interaction with a computing device. More particularly, the techniques described herein provide for a conversation graphical user interface (GUI) that enables users to intuitively understand their interactions with computing devices, particularly when speech input is involved.

As noted previously, users are demanding better experiences with smarter devices that understand more of what is being said by the user. Users are familiar with command-response systems, and simple question-answer systems. The next evolution beyond this is to provide users with devices that engage in conversation. Conversation introduces new complexity in that it not only involves accurately recognizing what words the user is speaking, but also involves reasoning and logic to interpret what the user is saying. Generally, the former issue pertains to improving speech recognition, and the latter pertains to improving natural language processing (NLP). More accurate conversation is achieved through a tight integration of these two technologies—speech recognition and NLP.

The conversation graphical user interface (GUI) aids the user by exposing why the computing device, or virtual assistant, responded the way it did. The conversation GUI helps the user understand whether non-optimal responses are due to issues involving speech recognition or NLP or perhaps a combination of the two.

The conversation GUI presents a series of dialog representations, such as speech bubbles exhibiting input from the user and responses from the virtual assistant. Associated with one or more of the dialog representations are one or more graphical elements to convey assumptions made to interpret the user input and derive an associated response. A control may be provided with each dialog representation that, upon selection by the user, alternately reveals or hides the assumptions. When revealed, the user can see the assumptions upon which the response was based.

The assumptions may include any number of items. For example, the assumptions may include parameters used by speech recognition engines to parse the user input, various language models and logic used by NLPs to interpret the user input, and external factors such as user profiles, learned behavior, and context indicia. In some cases, the assumptions may involve use of clarifications so that appropriate assumptions may be derived. For instance, if the user enters or speaks an input that is ambiguous, the conversation GUI may provide one or more clarifications that seek to have the user clarify his or her intent.

The user may then optionally change one or more of the assumptions. If a change is made, the conversation GUI is refreshed to present a modified dialog representation of a revised user input or a new response derived from the altered set of assumptions.

The conversation GUI may be implemented as part of a system that offers human-like conversation. In some implementations, the system provides virtual assistants that aid users when interacting with service providers via websites, phone, intranet sites, downloadable client applications, or any other type of platform on which the service provider may provide information to electronic devices of users. The service provider, meanwhile, may comprise a merchant, a news organization, an insurance agency, and/or any type of entity that provides items of any sort (e.g., products, digital content, services, etc.) to a user.

In order to identify a response (or "reply") to a particular user query, the techniques may take into account a context associated with a query in two different locations. First, the techniques may take into account the context associated with a query when determining the intent or meaning of the user's query. In addition, after identifying the user's intent with use of the context, the techniques may again take this context into account when determining a response or reply to provide back to the user. In some instances, the techniques take the same pieces of context into account when identifying the intent and the response, while in other instances the techniques may take into account different pieces of context. By taking context into account in both locations, the techniques are able to provide responses that more closely emulate human-to-human conversation than when compared to traditional techniques for identifying virtual-assistant responses.

To illustrate, a user may navigate to a site of a service provider that includes a virtual assistant, either on the site or adjacent to the site. The virtual assistant may include an avatar that resembles a human representative of the service provider (e.g., that represents a human face). In addition, the conversation GUI is provided to facilitate user input. The input may be a command, a statement, a query, an answer, and the like. In some instances, the user may type the query, while in other instances the user may provide input audibly, through touch, gesture, or in any other manner. A query may comprise a question (e.g., a user might ask "Can I upgrade my seat assignment on my next flight?" on an airline website) or may simply comprise one or more keywords or a phrase (e.g., "seat assignment upgrades").

In response to receiving the query, the system parses the user input and utilizes natural language processing techniques to identify one or more concepts expressed therein. In one example, the concepts may be based at least in part on keywords within the user input, although the concepts may additionally be determined using a richer process as discussed below. In one basic example, these concepts may comprise keywords or key phrases, such as "upgrade," "seat assignment", "flight", and the like in this example involving an airline website. After identifying the concept(s) expressed in the user input, the techniques may identify a context associated with the user input. The context associated with the input may include a context associated with the user, a context associated with the user's session on the site of the service provider, or the like. In some instances, a context is expressed as a value of one or more variables, such as whether or not a user has signed in with a site (e.g., "is_signed_in=true" or "is_signed_in=false"). A context associated with the user input may comprise a value associated with any type of variable that aids in understanding the meaning of a particular query provided by the user. Example, non-limiting pieces of context may include:

- whether or not the user has signed in with the site of the service provider (e.g., with a user name and password);
- a status of the user with the service provider (e.g., based on miles flown, a type of membership of the user, a type of subscription purchased by the user);
- a page of the site from which the user provides the query to the virtual assistant;
- how long the user has remained on the page of the site from which the user provides the query to the virtual assistant;
- a navigation history of the user during the session prior to the user providing the query to the virtual assistant;
- a location of a cursor on the site when the user provides the input to the virtual assistant;
- a prior query provided by the user to the virtual assistant during the session or a prior session;
- a time of day at which the user provides input to the virtual assistant;
- a date on which the user provides input to the virtual assistant;
- an age of the user;
- a location of the user (e.g., a geolocation of the user indicated by the device on which the user provides the query);
- a device type from which the user accesses the site (e.g., a mobile device, a desktop computer, game system, etc.);
- a language associated with the user (e.g., a language of the query submitted by the user);
- how the user interacts with the virtual assistant (e.g., whether the user submits a query textually, using voice input, etc.);
- how the interaction with the virtual assistant is initiated (e.g., via user selection of a link or graphic, via the virtual assistant proactively engaging the user, etc.);
- past interaction information between the user and the virtual assistant, either during the current session or during previous sessions (e.g., previous queries and responses, etc.)
- how the user has been communicating recently (e.g., via text messaging, via email, etc.);
- information derived from the user's location (e.g., current, forecasted, or past weather at the location, major sports teams at the location, nearby restaurants, etc.);
- current topics of interest, either to the user or generally (e.g., trending microblog or blog topics, current news, recent microblog or blog posts made by the user, etc.).

After identifying one or more pieces of context, such as one or more of those pieces of context listed above, the techniques may map the combination of: (1) the identified concept(s), and (2) the identified piece(s) of context to one of multiple different intents, each of which represents the techniques' best guess as to what exactly the user is asking about.

For instance, if a user provides a query stating "what are your store hours?" and the user is determined to be within one block of a brick-and-mortar location of the service provider, then the techniques may determine that the user's intent is to determine whether or not the store is open for the user to enter at this moment. If, however, the user provides a query of "general store hours" and the user is determined to be in a different city as a brick-and-mortar location of the service provider, then the techniques may determine that the user's intent is to learn about the general store hours throughout the week rather than whether or not the store is open at the instant that the user provides the query. In this example, the techniques may map the received queries to two different intents even though the identified concept (store hours) is the same or very similar.

After mapping the user's input to one of multiple different intents based on both the identified concepts and the context associated with the input, the techniques may then map the intent to one of multiple different responses associated with the intent. Returning to the example of the user within one block of a merchant providing the query "what are your store hours?", recall that the techniques have already mapped this query and surrounding context (e.g., location) to an intent indicating that the user is trying to determine whether or not she is able to enter the store at the instant time. Thereafter, the techniques may take into account the same or a different context of the query when identifying a response to provide to the user.

For instance, envision that the user issues this query at 8:50 pm and the store closes at 9:00 pm. Based on this context and the previously determined intent, the techniques the may provide a response to the user stating "We close in ten minutes! Hurry and come see us!" If, however, the user issues the query at 9:05 pm, then the techniques may provide a response stating "We just missed you! However, we are open tomorrow from 8 am to 9 pm."

In another example, a user may provide an initial query asking "may I upgrade my seat assignment on my next flight?" In response, the techniques may first map the query to an intent (based on context) and then again reference one or more pieces of context prior to determining a response to the query. For instance, envision that the techniques determine that the value of the variable "is_signed_in" is true and that the value of the variable "Gold_Customer" is also true, meaning that the user is in fact signed in with the service provider and is a "gold customer" at the service provider. In this example, the intent coupled with this context may map to a particular response, which may indicate that the all gold members are entitled to available upgrades. If, however, the value of the variable "Gold_Customer" is false but the value of the variable "Silver_Customer" is true, then the intent coupled with this different context may map to a response indicating that silver customers are entitled to upgrades in certain circumstances.

Furthermore, the techniques could take into account additional context when sending the response, such as a time that the query is received and a time of the user's next flight. If these times indicate that the user's flight is about to take off, the techniques could use this context to switch the communication channel between the user and virtual assistant. For instance, if the user submits the query via a web interface, but techniques determine that the user's flight is about to take off, then the techniques may send the response via a text message in addition or in the alternative to providing the response via the web interface. The techniques may also take into account past interactions between the user and the virtual assistant, communication channels the user regularly uses, communication channels the user has recently been using, and the like.

As described in detail below, a response provided back to a user may include content to be presented in the conversation GUI and/or one or more actions. For instance, a response may include content such as a textual answer or information displayed in the dialog representation, an audible answer or information audibly emitted from the user device, one or more hyperlinks to pages that have been determined to be related to the query, or the like. In some instances, the response may include a combination of these. For instance, the returned content may include text and one or more links that are written as a narrative from the perspective of the virtual assistant. This content may also be addressed to or otherwise tailored to the particular user, if recognized (e.g., "Yes, John, as a Gold Customer you are entitled to a seat upgrade, and I have provided some links below that may be of interest to you . . . "). In addition or in the alternative, the techniques may provide information audibly that appears to originate from the virtual assistant.

Additionally or alternatively, the techniques may perform an action on behalf of the user in response to receiving the query, such as causing a user's electronic device to navigate to a page deemed related to the query (e.g., to a page associated with Gold Customer upgrade policies), may alter a reservation or order on behalf of the user (e.g., upgrade the user's seat assignment), may initiate a request on behalf of the user (e.g., request the upgrade), may initiate a communication on behalf of the user, may purchase an item on behalf of the user, or may perform any other similar or different type of action in response to receiving the query.

By taking into account the context of a query both: (1) for the purposes of identifying an intent, and (2) after for the purposes of identifying a response identifying the intent, the techniques described herein allow for interaction between virtual assistants and end users that more closely mirror human-to-human interactions.

The conversation GUI is thus described below with reference to an example architecture involving virtual assistants, speech recognition, natural language processing, and other techniques to enhance human-synthesized conversation. It is to be appreciated, however, that other similar and/or different architectures may also implement these techniques.

Example Architecture

FIG. 1 illustrates an example architecture 100 that includes a user 102 operating an electronic device 104 to render content from a site of a service provider 106. The site may comprise a website, an intranet site, a downloaded application, or any other platform on which the user 102 may access information from the service provider 106. In this example, the user 102 accesses the site over a network 108, which may represent any type of communication network, including a local-area network, a wide-area network, the Internet, a wireless network, a wireless wide-area network (WWAN), a cable television network, a telephone network, a cellular communications network, combinations of the foregoing, and/or the like.

As illustrated, the device 104 renders a user interface (UI) 110 that includes content 112 from the service provider 106 and a conversation graphical user interface (GUI) 114 from a virtual-assistant service 116. In some instances, the conversation GUI 114 may be served from servers of the service provider 106 as part of the site, while in other instances the conversation GUI 114 may be served from servers of the virtual-assistant service 116 atop of or adjacent to the site. In either instance, the content 112 of the site may include any sort of details or information associated with the service provider 106, while the conversation GUI 114 is provided to assist the user 102 in navigating the content 112 or in any other activity.

The conversation GUI 114 engages the user 102 in a conversation that emulates human conversation. In some cases, the conversation GUI 114 may include a virtual assistant that has a human-like personality and persona. The virtual assistant may include an avatar that resembles a human, as represented by a profile 118. The avatar is an animated character that may take on any number of shapes and appearances, and resembles a human talking to the user 102. The avatar 118 may be arranged as a representative of the service provider 106, and hence be associated with the site content 112 as shown. Alternatively, the avatar 118 may be a dedicated personal assistant to the user 102, and hence be associated with the conversation GUI 114, either as part of the panel area or elsewhere in the UI 110, but displayed in association with the conversation GUI 114.

The conversation GUI 114 conveys a visual representation of a conversation between the user 102 and the virtual assistant 118 (or computing device 104). The conversation GUI 114 presents a series of dialog representations 120 and 122, such as graphical content bubbles, which are designated to the user or the virtual assistant. In this illustration, the user-originated dialog representations 122 contain input from a user (verbal or otherwise) and the device- or assistant-originated dialog representations 120 contain responses from the device or virtual assistant. The representations 120 and 122 may be offset in the conversation GUI 114 to visually convey which person is associated with the content. Here, the assistant-originated dialog representation 120 is offset to the left, whereas the user-originated dialog representation 122 is offset to the right. The conversation GUI 114 also includes an interface area 124 that captures input from the user 102, including via typed input, audio or speech input, touch input and gesture input. Gesture or emotive input may be captured if the computing device 104 is equipped with a camera or other sensor.

Associated with one or more of the dialog representations 120 and 122 are one or more graphical elements to convey assumptions made to interpret the user input and derive an associated response. The conversation GUI 114 enables the user to see the assumptions upon which the response was based, and to optionally change the assumption(s). Upon change of an assumption, the conversation GUI 114 is refreshed to present a modified dialog representation of a new response derived from the altered set of assumptions. Examples of this are described in more detail below with reference to FIGS. 2-10.

As noted above, the user 102 may enter a query into the interface area 124 of the conversation GUI 114. The computing device 104 transmits this query over the network 108 to the virtual-assistant service 116. In response, a variable-response module 126 of the virtual-assistant service 116 may identify a response to provide to the user 102 at least partly via the virtual assistant. For instance, the variable-response module 126 may map the user query to an intent based on a context of the query and may then map the intent to a response, again with reference to the context of the query. After identifying the response, the virtual-assistant service 116 and/or the service provider 106 may provide the response the computing device 104 for presentation to the user 102. The response may be added to a dialog representation of the conversation GUI 114 and/or audibly played to the user.

As illustrated, the virtual-assistant service 116 may comprise one or more computing devices (e.g., one or more servers) that include or otherwise have access to one or more processors 128, one or more network interfaces 130, and memory 132, which stores the variable-response module 126. The service provider 106, meanwhile, may comprise one or more computing devices (e.g., one or more servers) that include or otherwise have access to one or more processors 134, one or more network interfaces 136, and memory 138, which stores content 140 of the site of the service provider 106.

Finally, the electronic device 104 of the user 102 may include or otherwise have access to one or more processors 142, one or more network interfaces 144, and memory 146, which stores a client application 148 for rendering the UI 110. The client application may comprise a browser for rendering the site content 140, a downloaded application provided by the service provider 106, or any other client application configured to output content from the service provider 106. While FIG. 1 illustrates the service provider 106 storing the site content 140, in some instances the client application 148 may store some or all of this content locally on the device 104.

Furthermore, while FIG. 1 illustrates the electronic device 104 as a desktop computer, the electronic device 104 may comprise any sort of device, such as a mobile phone, a multifunctional device, a laptop computer, a tablet computer, a personal digital assistant (PDA), or the like. In each instance, the electronic device 104 may include various additional components, such as one or more output devices (e.g., displays, speakers, etc.), one or more input devices (e.g., a keyboard, a touchscreen, etc.), an operating system, system busses, and the like.

The various memories 132, 138, and 146 store modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

While FIG. 1 illustrates one example architecture for providing variable responses, it is to be appreciated that multiple other architectures may implement the described techniques. For instance, while FIG. 1 illustrates the service provider 106 as separate from the virtual-assistant service 116, in some instances some or all of these components may reside in a common location, spread out amongst multiple additional entities, located on the electronic device 104, and/or the like.

Example Variable Responses

Figure 2A:
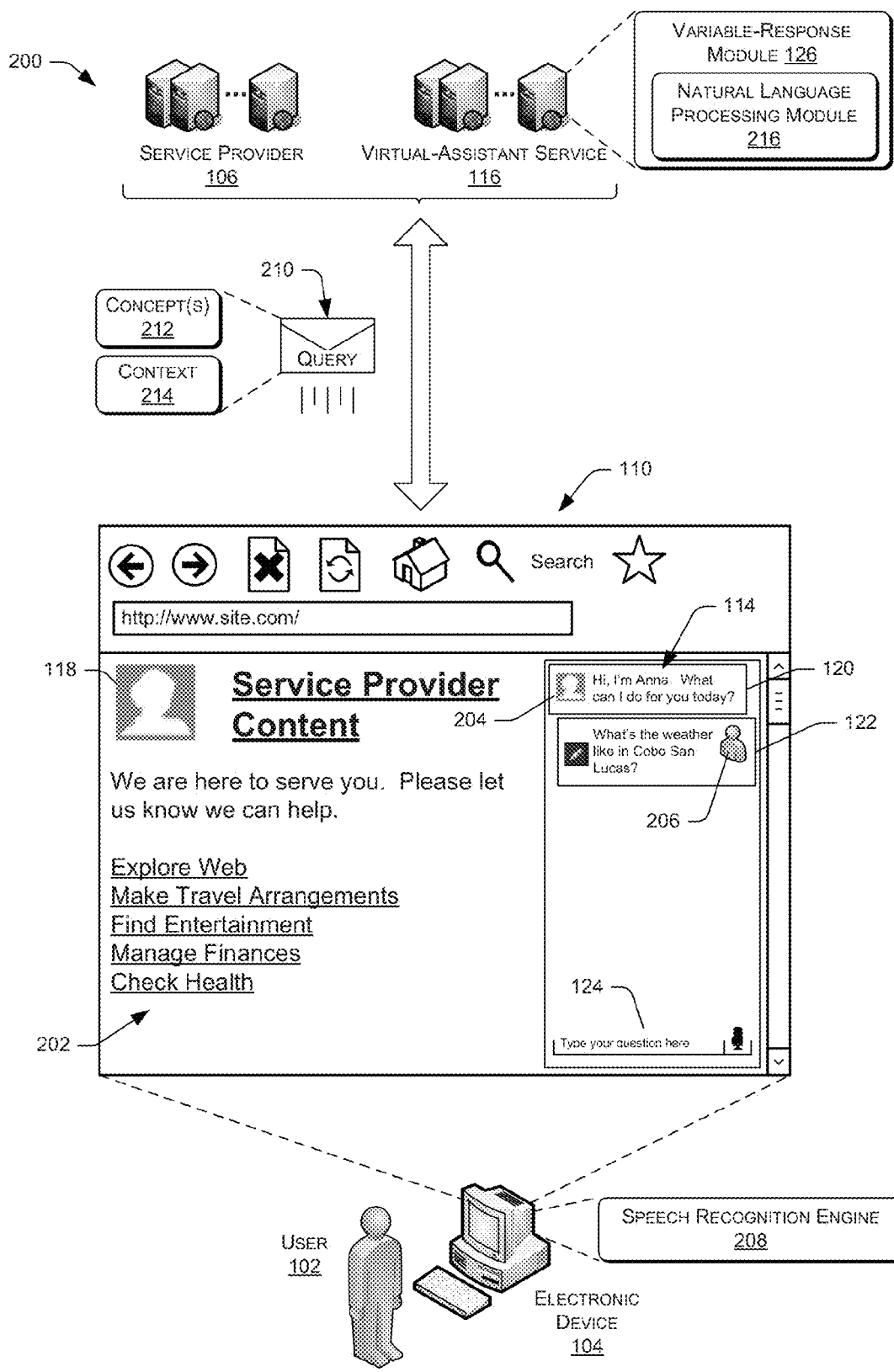
FIGS. 2A-B collectively illustrate a high-level communication flow between an electronic device of the user and the service provider and/or the virtual-assistant service. The figures illustrate the conversation GUI and formation of dialog representations of user inputs and responses of the virtual assistant in a first scenario involving weather in Cabo San Lucas.
Figure 2B:
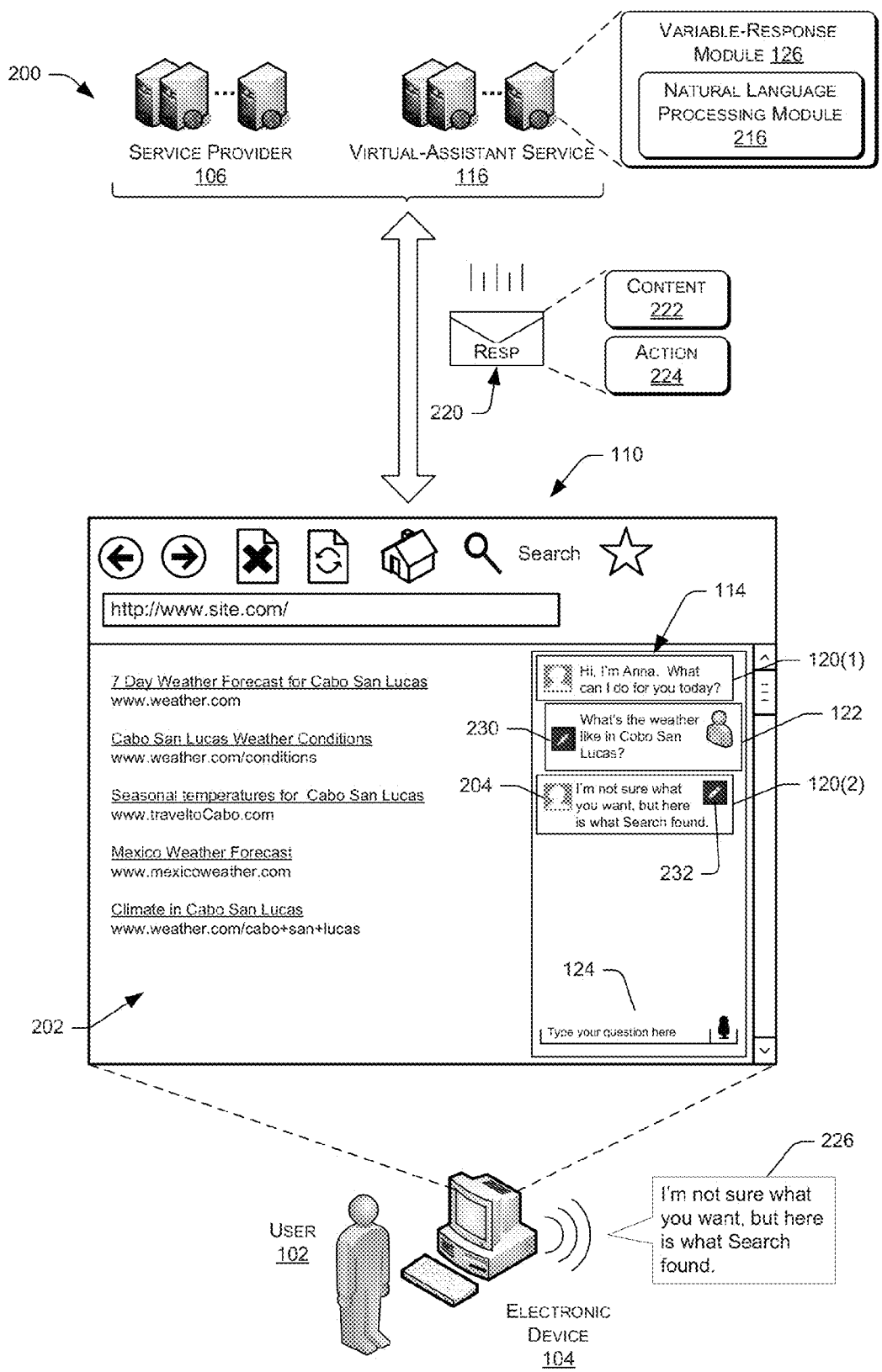

FIGS. 2A-B collectively illustrate a high-level communication flow 200 between the example electronic device 104 of the user 102 and the service provider 106 and/or the virtual-assistant service 116. As illustrated, the electronic device 104 renders a user interface (UI) 110 that includes a virtual assistant avatar 118 and content 202 from the service provider 106 and the conversation GUI 114 from the virtual-assistant service 116. In some instances, the virtual-assistant service 116 serves the conversation GUI 114 to the device 104, while in other instances the service provider 106 serves the conversation GUI 114, either as part of the site content 204 or after receiving the GUI 114 from a separate virtual-assistant service 116.

In either instance, the example content 202 here represents a home page of an example service provider. The content includes a title of the page, a welcome statement, and links to possible service offerings (e.g., Explore Web, Make Travel Arrangements, etc.).

The conversation GUI 114 emulates human-to-human interaction between the user 102 and the service provider 106. In this example, the GUI 114 includes one or more assistant-originated dialog representations 120 associated with the service provider, and these representations 120 include a small image of the virtual assistant 204. The virtual assistant image 204 may be associated with the service provider, as above, or alternatively as a personal digital assistant personalized for the user 102. In this illustration, the virtual assistant 118 initiates the conversation (e.g., "Hi, I'm Anna What can I do for you today?") as represented by the top most dialog representation in the conversation GUI 114.

The conversation GUI 114 also includes one or more user-originated dialog representations 122 associated with the service provider, and these representations 122 include a small image 206 of the user 102. This user-originated dialog representation 122 is presented as part of the GUI 114 in response to the user entering a query in the entry area 124. In this example, the user input is a question, "What's the weather like in Cobo San Lucas". The user may have typed the question or verbally asked the question. The query may be entered and submitted by hitting a return key, actuating a control icon (not shown), or any other mechanism. The dialog representation 122 may appear in the conversation GUI 114 upon entry of the query as illustrated here. Alternatively, the dialog representation 122 may appear in concert with the responsive dialog representation that is returned from the virtual-assistant service 116.

In the case of verbal input, the computing device 104 may include a speech recognition engine 208 that receives the vocal audio data captured by a microphone. The speech recognition engine 208 may convert the audio to digital, optionally computes a frequency transform, and identifies parts of speech for use in deciphering the speech of the user 102. In some implementations, the speech recognition engine 208 may reside at the virtual assistant 116, while in other implementations, functionality in the speech recognition engine 208 is distributed at the computing device 104 and virtual-assistant service 116. In other implementations, the speech recognition engine 208 may be a third party service that is leveraged by the virtual-assistant service 116 and/or the computing device 104.

In some instances, the device 104 provides the query 210 directly to the service provider 106, which identifies an appropriate response and may provide this response back to the device 104 or to another device associated with the user. In other instances, the provider 106 may receive the query 210, provide the query 210 to the service 116, receive a response from the service 116, and provide the response to the device 104 or to another device associated with the user. In still other instances, the device 104 provides the query 210 to the service 116 directly, which may identify a response or provide the query 210 to the provider 106 for identifying a response. The service 116 or the provider 106 may then provide the response to the device 104 or to another device associated with the user. Of course, while a few example communication flows have been described, it is to be appreciated that other communication flows are possible.

In this example, notice that the user's input in dialog representation 122 contains a mistaken entry in that the word "Cobo" in "Cabo San Lucas" is misspelled. This misspelling may be a result of an incorrectly typed entry, or a mistaken output of the speech recognition engine. The dialog shows what was entered, and this user input is conveyed to the virtual-assistance service 116 and/or service provider 106.

In each instance, the query 210 sent to the provider 106 and/or the service 116 may comprise the words and phrases within the string of text entered by the user, from which concepts 212 may be derived. In some implementations, the concepts 212 may be derived at least partly by the computing device 104 through some natural language pre-preprocessing. In other implementations, the concepts may be derived as part of the virtual-assistant service 116 or a combination of the device and service.

The query 210 sent to the provider 106 and/or the service 116 may further comprise one or more pieces of context 214. The context 214 may be based on any additional factors associated with the user, the device 104, or the like. As described above, for instance, the context 214 may include whether or not the user is signed in with the service provider 106, a status of the user 102 with the service provider, an age of the user 102, a type of device from which the user 102 provides the query 214, or the like.

The query 210 is handled by the variable-response module 126. A natural language processing module 216 is provided as part of the variable-response module 126. The NLP module 216 receives the speech parts output by the speech recognition engine 208 and attempts to order them into logical words and phrases. The NLP module 216 may employ one or more language models to aid in this interpretation. The variable-response module 126 ultimately processes a response to be returned to the computing device 104.

FIG. 2B continues the illustration and represents the service provider 106 and/or the virtual-assistant service 116 providing a response 220 for output on the electronic device 104 or on another electronic device associated with the user 102. As described above and in further detail below, the provider 106 and/or the service 116 may have identified the response by first mapping the concepts 212 and the context 214 to an intent, and thereafter mapping the intent and the context 214 to the response 216. As illustrated, the response 220 may comprise content 222, one or more actions 224 to perform, or a combination thereof.

Upon receipt of the response, the conversation GUI 114 is refreshed or updated to include the response. The response may be provided as one of the textual-based dialog representations. For example, a new assistant-originated dialog representation 120(2) is added to the dialog panel and visually associated with the virtual assistant through the left-side orientation and the image 204. This is the second dialog representation associated with the virtual assistant. As noted above, the user-originated dialog representation 122 may be presented together with the response, if not already part of the dialog panel. In addition to a text display as part of the conversation GUI 114, the response may also be audibly provided to the user, as represented by the audible output 226.

As noted above, due to the misspelling of the word "Cabo", the virtual-assistant service 116 may not have been able to adequately ascertain what the user was saying in this part of the conversation. This may have been due to the speech recognition engine being unable to satisfactorily recognize the input and/or due to the NLP module 218 being unable to interpret the input as recognized. Accordingly, the new dialog representation 120(2) includes a statement, "I'm not sure what you want, but here is what Search found." This same statement may be audibly emitted at 216. The results from searching based on the misspelled text string "Cobo San Lucas" is provided in the content area 202 of the UI 110. Thus, the response 216 may include one or more actions 220 for performance on behalf of the user 102. Here, for instance, the response 216 has instructed the device 104 to navigate to a new page of the site of the content provider, with this page being associated with the user input. In this example, the new content in area 202 has links to weather forecasts of Cabo San Lucas, seasonal temperatures, Mexico weather forecasts, and the like.

The actions 224 included in the response may vary widely in type and purpose. Example actions 224 might include purchasing an item on behalf of the user, initiating a request on behalf of the user, initiating a communication on behalf of the user, communication to others on behalf of the user, and altering a reservation or order on behalf of the user.

Example Conversation GUI

Within continuing reference to FIG. 2B, notice that two of the dialog representations 122 and 120(2) contain respective controls 230 and 232 positioned in association with the text display. The controls 230 and 232 may have any associated icon, and is actionable by mouse click or other mechanisms. The controls 230 and 232 enable the user to interact with the conversation GUI 114 in a way to ascertain how dialog portions were assembled. That is, through use of the controls, the user can evaluate what assumptions went into understanding the user input and how the response was determined. By revealing these assumptions in an intuitive user interface, the user can quickly ascertain, for example, whether the virtual assistant misunderstood the user input due to a potential misrecognition by the speech recognition engine or whether the user input was misinterpreted by the NLP module. The conversation GUI 114 then allows the user to modify those assumptions used to determine the response.

In FIG. 2B, suppose the user recognizes that the virtual assistant was confused by the input since the response said, "I'm not sure what you want, but . . . ". The user might then revisit his own dialog representation 122 of the last input, and realize that he either entered the name "Cabo San Lucas" incorrectly, or the speech recognition engine misrecognized the word intended word "Cabo" as the mistaken word "Cobo" instead. Upon seeing this error, the user may actuate the control 230, which request the conversation GUI 114 to provide information pertaining to the assumptions made in the reception of the user input in representation 122.

Figure 3:
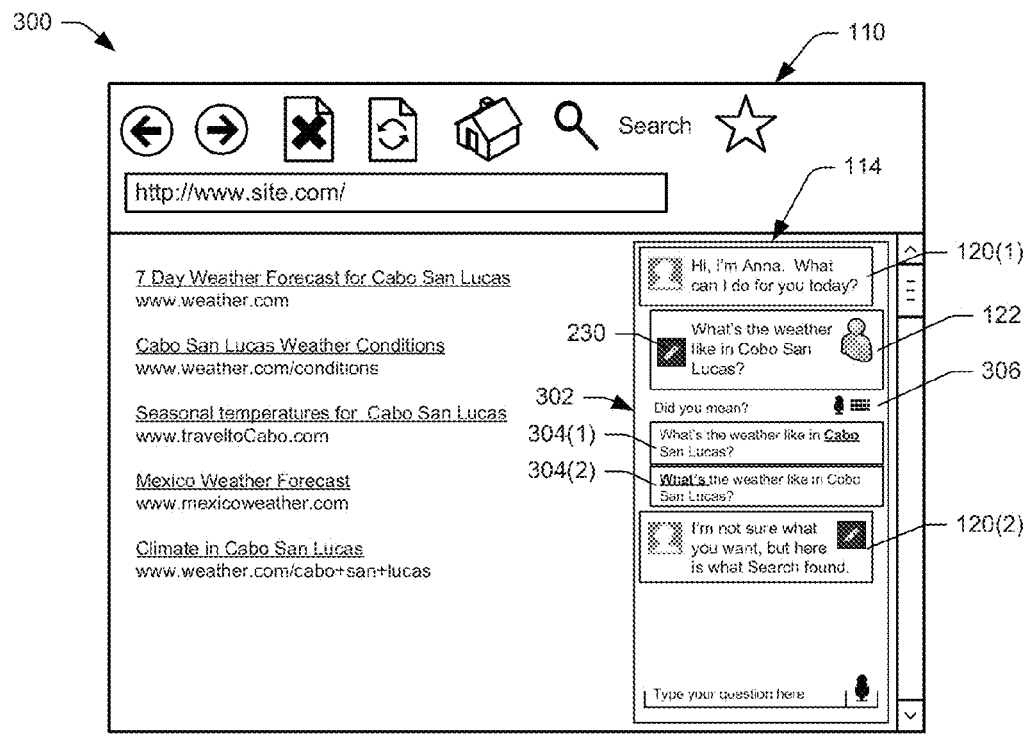
FIG. 3 shows the conversation GUI at an instance when the user is exploring why the virtual assistant was unable to respond to the user's input. This figure shows clarification elements that seek to clarify what the user meant in the preceding input.

FIG. 3 shows an instance 300 of the UI 110 that is presented in response to user actuation of the control 230 of the user-originated dialog representation 122 in the conversation GUI 114. The user actuates this control when the user is exploring why the virtual assistant was unable to understand the user's input during the conversation. When two people converse and one person does not comprehend a statement, that person will often ask clarifying questions. To emulate this human behavior, the conversation GUI 114 will expose or reveal the assumptions used and why they were not adequate to make the interpretation.

As shown in FIG. 3A, upon actuation of control 230, the second assistant-originated dialog representation 120(2) is repositioned or visually slid lower in the dialog panel beneath the user-originated dialog representation 122. In the newly created gap, one or more assumptions 302 are revealed. In this scenario, the assumptions 302 include clarification elements 304 that seek to clarify what the user meant in the preceding input. Here, there are two clarification elements 304(1) and 304(2), although there may be one or more in other scenarios. In this scenario, the problem with understanding the user input centers on the entered word "Cobo". The speech recognition engine 208 and NLP module 216 have attempted to understand the input, and the best efforts did not rise to a sufficient confidence level for the variable-response module 126 to return a more affirmative response. Instead, the best efforts might include results from an N-best list or the top scoring phrases as understood by the NLP module. When the processing results do not reach a predetermined confidence level or when the user is not satisfied with the response or action, the assumptions made to return the response 120(2) are revealed as clarification elements 304 in an effort to increase the confidence level or the user's satisfaction.

The first clarification element 304(1) seeks to clarify whether the user mistyped the word "Cabo" by asking whether the user meant "Cabo San Lucas" as opposed to the "Cobo San Lucas". If it was simply an input error, the user can quickly and intuitively understand the mistake and that it was not a situation where the virtual assistant was not functioning properly. To cure the spelling, the user merely selects this first clarification element 304(1). It is noted that this example employs a strict match of words, and hence "Cobo" did not have a match. In other implementations, fuzzy match may be employed in which the term "Cobo" may actually rise above a confidence threshold as being a mistyped version of "Cabo".

The second clarification element 304(2) assumes that you did indeed want "Cobo San Lucas" and attempts to confirm that. So, the assistant emulates a human by asking essentially the same question back to clarify that is indeed what the user asked. The user can confirm that the original input was accurate by selecting this second clarification element.

The user can select these elements 304(1) and 304(2) in a number of ways. The user can use mouse over the elements 304(1) and 304(2) and select them, or on a touch screen device, can simply touch the appropriate box. Alternatively, the user can use a keyboard or keypad to select the appropriate one, or modify the existing input either with the keyboard or verbally. Icons 306 inform the user of these latter two options, and upon selection, receive the user input.

For purposes of ongoing discussion, suppose the user selects the first clarification element 304(1) to clarify that he meant to enter "Cabo" instead of "Cobo". This information is returned to the variable-response module 126 at the virtual-assistant service 116 where it is reprocessed to determine a new response. This new or modified response is then returned to the client device 104 of the user 102.

Figure 4:
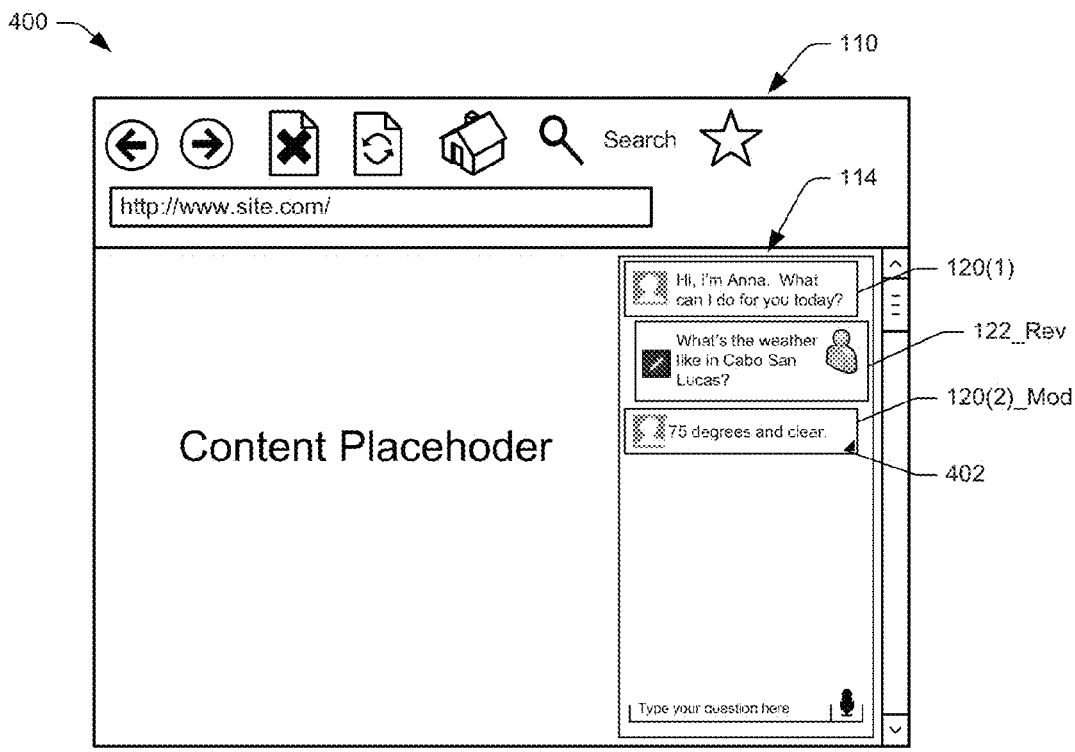
FIG. 4 shows the conversation GUI at an instance after that shown in FIG. 3, to illustrate a modified dialog representation for the user after clarification is made.

FIG. 4 shows an instance 400 of the UI 110 that is presented in response to user selection of the clarification element 304(1) in the conversation GUI 114. The assumptions portion 302 shown in FIG. 3 is removed or hidden and the user-originated dialog representation is revised to include the correct spelling of "Cabo". This revised dialog representation is now referenced as 122_Rev. In addition, the second assistant-originated dialog representation is modified to present the new response determined after the clarification is made. In FIG. 4, the modified dialog representation referenced as 102(2)_Mod now states, "75 degrees and clear", emulating a human response to the question, "What's the weather like in Cabo San Lucas?". Due to the clarification, the interpretation of the query resulted in a higher confidence level than before, and hence the variable-response module 126 returned a more specific response.

The modified dialog representation 120(2)_Mod may optionally include an expand icon 402 that provides a visual cue to expand the box. Suppose the user selects the icon 402 to expand the box. The expanded box is shown next in FIG. 5.

Figure 5:
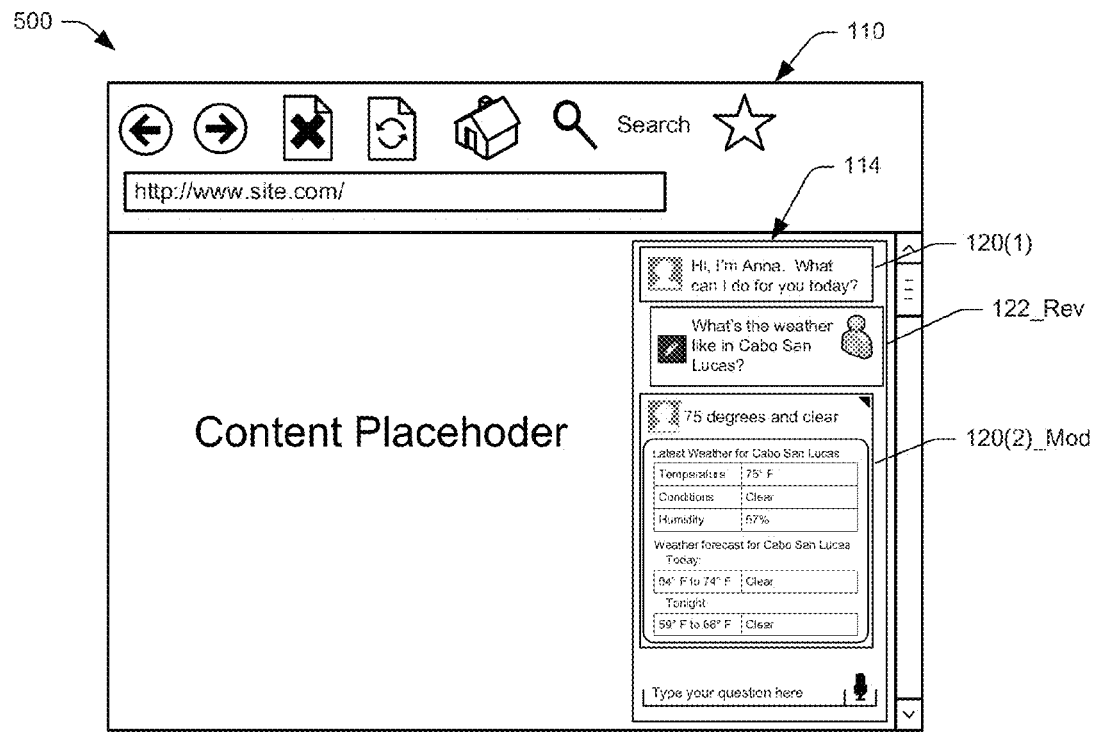
FIG. 5 shows the conversation GUI at an instance after that shown in FIG. 4 following user selection, via the GUI, to view more detail in a dialog representation.

FIG. 5 shows an instance 500 of the UI 110 that is presented in response to user selection of the expand option 402 of dialog representation 120(2)_Mod in the conversation GUI 114. Upon selection, the dialog representation 120(2)_Mod is expanded to reveal more details about the response. In this example, additional details about the weather in Cabo San Lucas are shown, including current temperature, conditions, and humidity, as well as weather forecasts. This information is merely an example, and other or different information may be provided.

A reduce icon 502 is provided at the top right corner of the expanded version of the modified dialog representation 120(2)_Mod. The reduce icon 502 provides a visual cue to reduce the box back to its original size, as shown in FIG. 4.

Accordingly, the example described with respect to FIGS. 2-5 illustrates one way that the conversation GUI 114 allows the user to engage in a conversation and intuitively modify the conversation in a human-like fashion. In this example, there was an issue with the user input, in that it was either not understood by the speech recognition engine or the user entered the input incorrectly. The conversation GUI 114 graphically revealed the assumptions made to determine an original response to the user's input. Since that original response did not seem quite accurate or did not seemingly follow the user's input, the GUI 114 further provided a way for the user to modify or change those assumptions so that a more appropriate response may be returned. As a human would do in a conversation, the GUI 114 provided the reasoning and logic hints underlying the assumptions that allowed the user to very quickly grasp the issue and correct it. Through this GUI 114, the user believed that he is conversing with the virtual assistant and merely clarifying his remarks, rather than being left with a feeling that the system did not get it, or missed it, which is more common in traditional limited, single question/answer computer interaction experiences.

Figure 6:
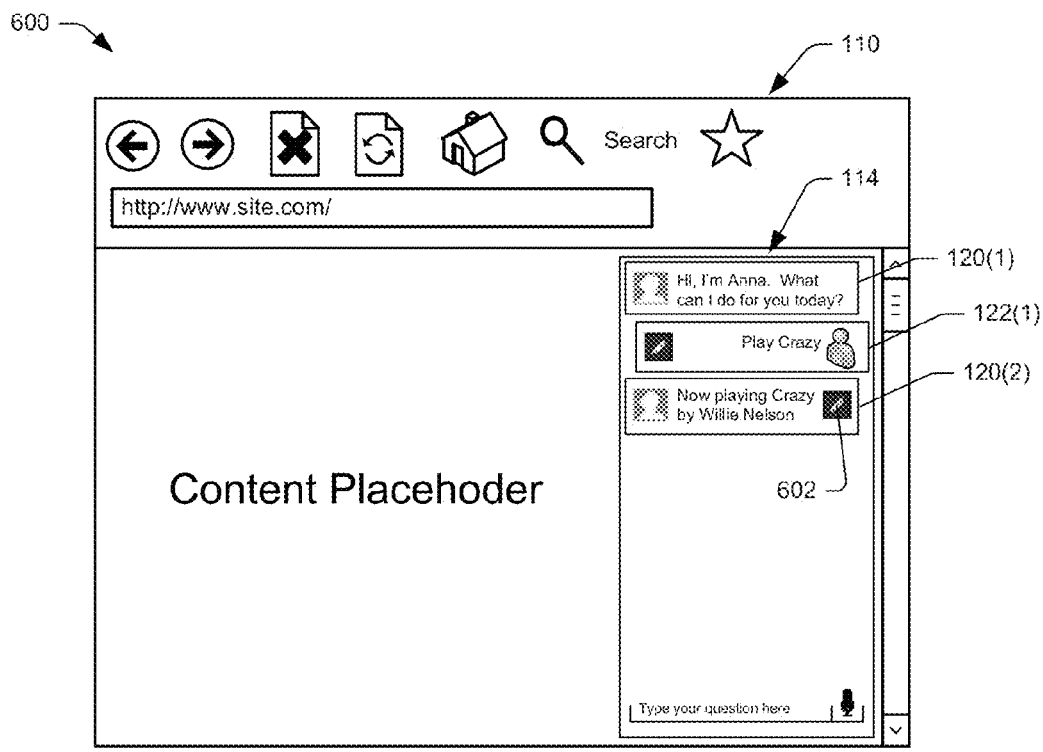
FIG. 6 shows the conversation GUI involving a second scenario involving the selection of media content.
Figure 7:
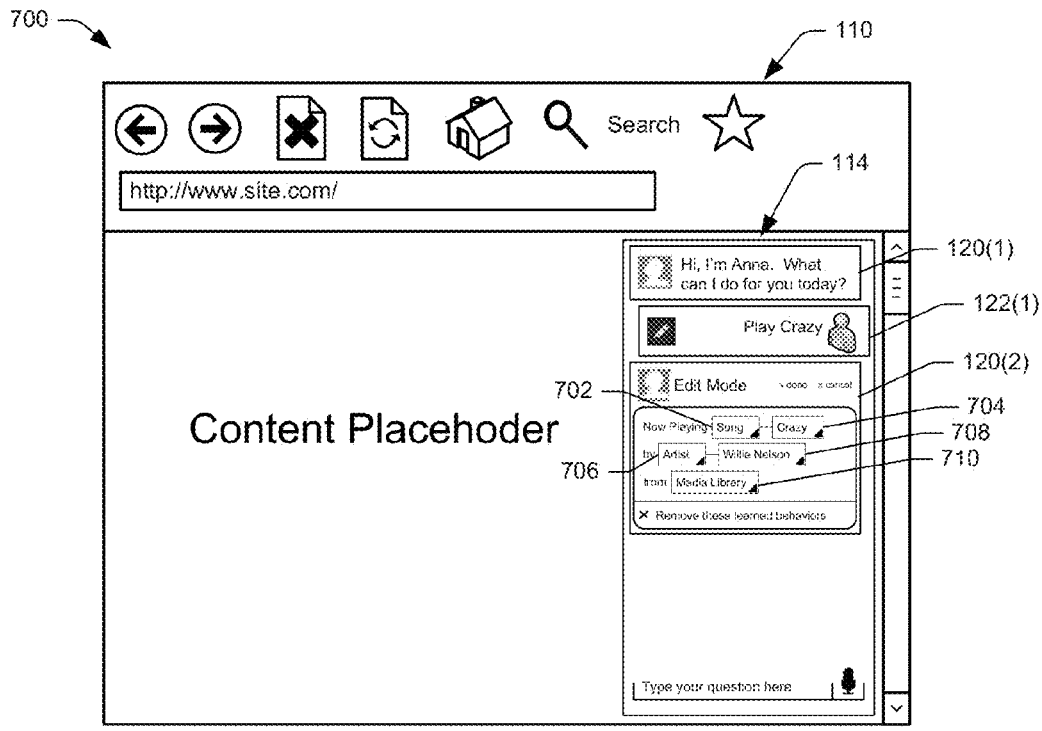
FIG. 7 shows the conversation GUI at an instance after that shown in FIG. 6 to show assumptions made to determine a response to the user input.
Figure 8:
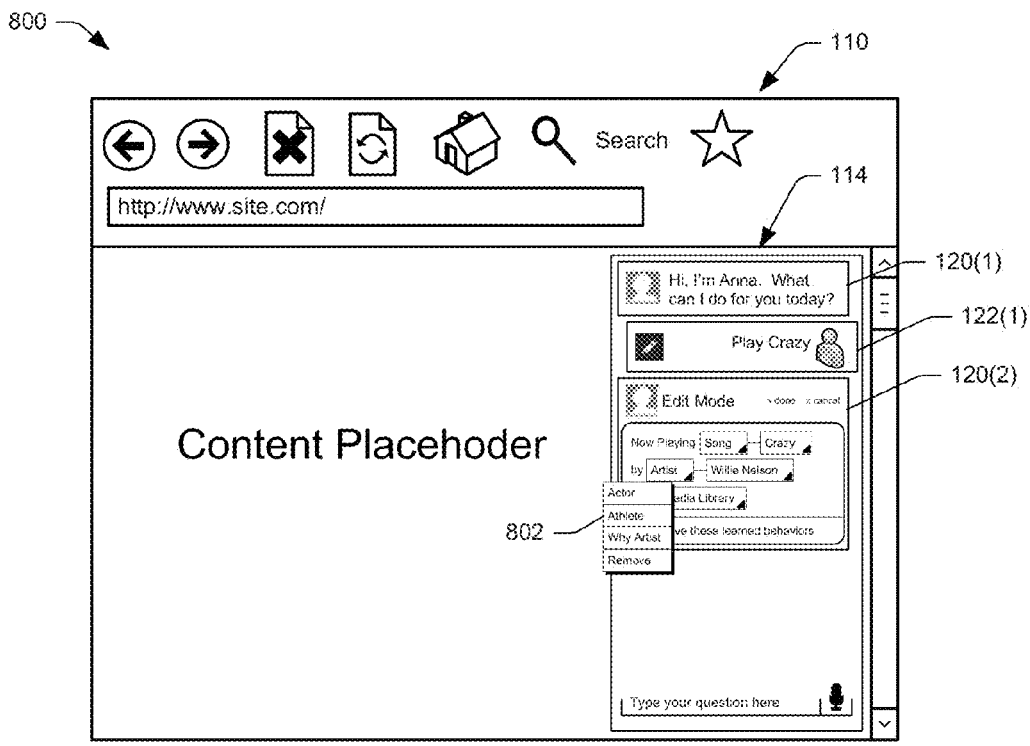
FIG. 8 shows the conversation GUI at an instance after that shown in FIG. 7 to illustrate user interaction to modify the assumptions.

FIGS. 6-8 show another example scenario using the conversation GUI 114 involving the selection of media content. Unlike the scenario in FIGS. 2-5, in this scenario, the user input is clearly entered and recognized. However, the user input may be sufficiently vague that the variable-response module 126 makes one or more assumptions in preparing response. These assumptions may involve adjustments to the NLP module (like use of different language models), learned behavior of the user, context of the situation, and so forth.

FIG. 6 shows a first instance 600 of the UI 110 in which the conversation GUI 114 is supporting a conversation involving the second scenario of selecting media content. In this example, the user's first input following the welcome dialog representation 120(1) is to "Play Crazy", as illustrated in the first user-originated dialog representation 122(1). The variable-response module 126 makes several assumptions and decides the most likely response that satisfies the confidence threshold would be to play the song "Crazy" by Willie Nelson. The second assistant-originated dialog representation 120(2) contains the response, "Now playing Crazy by Willie Nelson". This response may be accompanied by an action to begin playing the audio file of the song "Crazy". This action may be directed to the computing device 104 to play a local file, or a file contained at the service provider, such as a cloud-based musical service. The action may also be directed to another entertainment device proximal to the user to play the song "Crazy".

For the sake of continuing discussion, suppose the user is fine with his input of "Play Crazy" because that is what he indeed said and meant to say. But, further suppose that the user did not intend to play the song "Crazy". The conversation GUI 114 allows the user to view the assumptions that went into this selection and to modify the assumptions. The user can select the control 602 associated with the response dialog representation 120(2) to reveal the assumptions.

FIG. 7 shows a second instance 700 of the UI 110 in which the conversation GUI 114 is refreshed after the user selects the control 602 of FIG. 6. The assistant-originated dialog representation 120(2) is expanded to an "edit mode" to allow the user to examine the underlying assumptions. In determining the response, the variable-response module 126 uses any number of various pieces of information to generate possible outcomes, and then chooses one (e.g., best or highest confidence score, one that matches some user preference, etc.) as the response. As an example, the variable-response module 126 may rely, at least in part, on learned behavior. For instance, this particular user may exhibit a preference for Willie Nelson that has been learned over time, and hence playing a song named "Crazy" by Willie Nelson returns a high confidence level. As another example, the variable-response module 126 may rely, at least in part, on context factors, such as time of day or client device being used to make the user query. Perhaps the user has shown a likelihood of listening to country western music in the evening, or perhaps the user has "Crazy" stored locally on this user computer 104 and the system gives preference for local media libraries. As another example, the user may have just navigated from a webpage that talked about Willie Nelson or the song Crazy and the system inferred from this activity that the user was interested in playing this Willie Nelson song.

The "edit mode" of the assistant-originated dialog representation 120(2) contains the assumptions. In this example, the assumptions include a type 702, a title 704, a player 706, a player name 708, and a source 710. The type assumption 702 and associated title assumption 704 reveal that the variable-response module 126 assumed the user wanted to play a "song" entitled "Crazy". The player assumption 706 and corresponding player name assumption 708 indicate that the person affiliated with the song "Crazy" is a musical artist named "Willie Nelson". The source assumption 710 notes the source location of the audio file as being from the user's "Media Library".

Some assumptions may exhibit a comparatively higher level of confidence. Those assumptions may also be called "variables". In this case, the title assumption 704 may rise to a level of being a variable as the variable-response module 126 has a very high confidence that it matched the user input to something called "Crazy". The remaining assumptions may not rise to this level of confidence. In one implementation, the assumption graphic elements 702-710 may be color coded to differentiate variables of high confidence and the remaining assumptions. Here, for example, the title variable 704 may be colored gray while the remaining assumptions 702 and 706-710 may be colored blue.

Each assumption graphic element may further include an expand control, as shown by the icon in the lower left corner of the boxes. Actuation of these expand controls allows the user to change the assumption. Suppose, for example, that the user wants to look at the player assumption 706 by actuating the associated expand control.

FIG. 8 shows a third instance 800 of the UI 110 that is presented in response to selection of the expand control associated with the player assumption 706. A menu 802 of alternative assumptions is presented in proximal location to the player assumption 706 to visually convey the connection. In this illustration, the alternative assumption menu 802 includes four options: (1) "actor", which allows the user to change artist to actor, (2) "athlete", which allows the user to change artist to athlete, (3) "why artist", which allows the user to discover why the artist category was selected, and (4) "remove", which allows the user to remove the assumption.

Accordingly, the example described with respect to FIGS. 6-8 illustrates another way that the conversation GUI 114 allows the user to engage in a human-like conversation. In this example, there was an issue with the vagueness of the user input, and the conversation GUI 114 graphically revealed the assumptions made to determine an original response to the user's input. Through use of the conversation GUI 114, the user is able to modify those assumptions to enable a different response.

Figure 9:
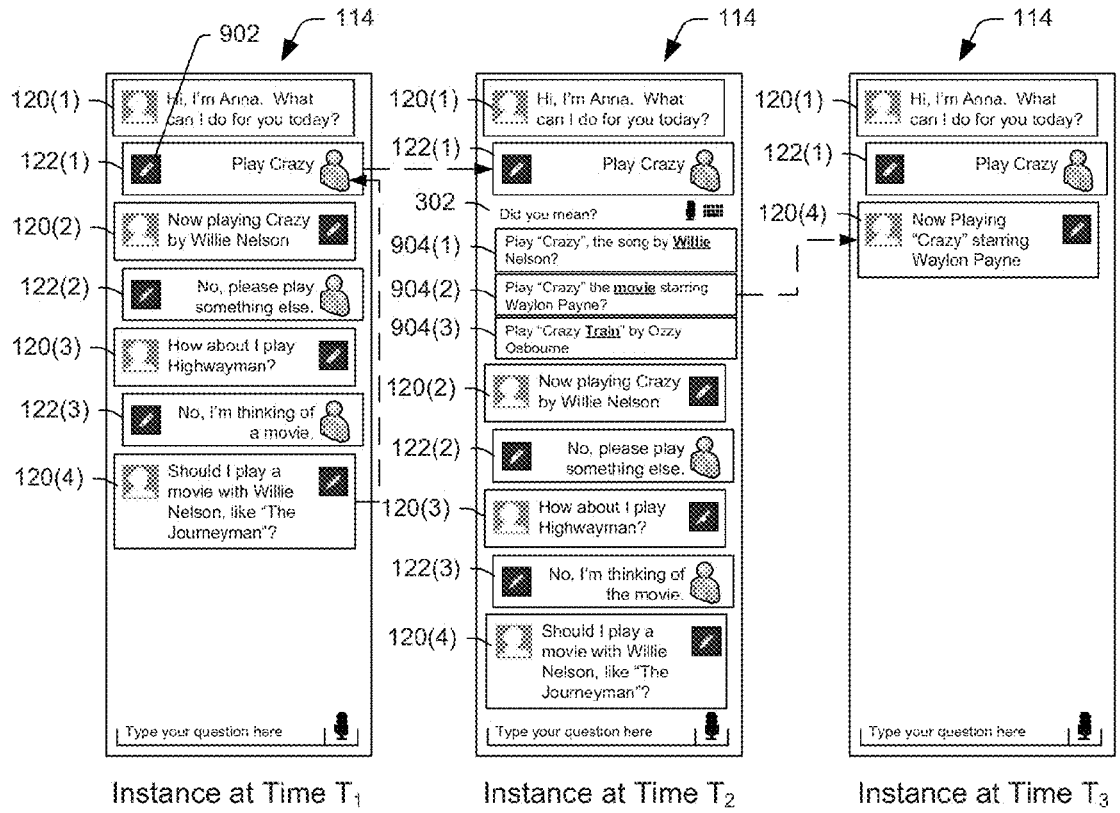
FIG. 9 shows a sequence of instances of the conversation GUI to illustrate how a user can navigate within the GUI to restart the conversation at any number of points in the ongoing conversation.

FIG. 9 shows yet another example scenario using the conversation GUI 114 involving the selection of media content. In this scenario, a sequence of three instances of the conversation GUI 114 taken at time $T_1$, $T_2$, and $T_3$ are shown to illustrate how a user can navigate within the conversation GUI 114 to restart the conversation at any number of points in the ongoing conversation. This ability to intuitively go back in time in a conversation emulates a human conversation. For instance, when a speaker realizes that the hearer did not understand a premise or portion in the conversation, the speaker may return to that part of the conversation to clarify an intention, essentially restarting that conversation from that point.

The conversation GUI 114 taken at the instance of time $T_1$ shows more of the conversation described in FIGS. 6-8. Unlike FIG. 6, where the user actuates the control 602 associated with the assistant-originated dialog representation 120

(2), here the user continues the conversation to try to explain his intention more clearly. Accordingly, after the dialog representation 120(2), the user provides a new input by typing or saying, "No, please play something else", as represented by the user-originated dialog representation 122(2). From this input, the variable-response module 126 determines that the user wants another song by Willie Nelson, and returns a response that proposes playing another song (e.g., "How about I play Highwayman?"), as represented by the assistant-originated dialog representation 120(3).

At this point in the conversation, the user realizes that the virtual assistant still believes, based on the assumptions made during the conversation, that the user in interested in music by Willie Nelson. But, in reality, the user wanted to watch a movie by the same title, "Crazy". Accordingly, the user may simply input, "No, I'm thinking of a movie", as represented by the user-originated dialog representation 122(3). At this point, the variable-response module 126 at the virtual assistant service 116 has more information regarding the user's intent; namely, that the user wants to watch a movie. This changes one of the assumptions from music to movies. However, based on the conversation so far, the virtual assistant service 116 still believes that the user is interested in Willie Nelson. Hence, the virtual assistant service 116 returns a response asking the user whether he is interested in a movie by Willie Nelson (e.g., "Should I play a movie with Willie Nelson, like "The Journeyman"?), as represented by the assistant-originated dialog representation 120(4).

At this point, like any natural human conversation, the user recognizes that the virtual assistant is still assuming he wants to consume some entertainment performed by Willie Nelson. Further, the user realizes that the miscommunication came much earlier in the conversation, namely as far back as the opening request of "Play Crazy" in the first user-originated dialog representation 122(1). Accordingly, using the conversation GUI 114, the user may navigate back to this dialog representation 122(1) and select the control 902. In this fashion, the user is essentially moving back in time in the conversation to an earlier point, as illustrated by the dashed line from representation 120(4) to representation 122(1).

Upon selection of the control 902, the conversation GUI 114 is updated to reveal the one or more assumptions 302 that went into the understanding of the user input "Play Crazy". This is shown at the instance of time $T_2$ in FIG. 9. The other dialog representations 120 and 122 are repositioned lower in the dialog panel to make room for the assumptions 302. In this scenario, the assumptions 302 include three clarification elements 904(1), 904(2), and 904(3) that seek to clarify what the user meant in the preceding input. The clarification elements ask whether the user meant to (A) play "Crazy", the song by Willie Nelson at 904(1), or (B) play "Crazy", the movie starring Waylon Payne at 904(2), or (C) play "Crazy Train" by Ozzy Osbourne at 904(3). The combination of these clarifications in the intuitive GUI 114 allow the user to either affirm the virtual assistant's best guess (i.e., play the song "Crazy" by Willie Nelson), or to change assumptions associated with type (i.e., song or movie) and artist name (i.e., Willie or Ozzy).

For purposes of discussion, suppose the user wanted to play the movie "Crazy" and selects the clarification element 904(2). In response, the virtual assistant service 116 determines a new response that informs the user that the movie will be started and the conversation GUI 114 is refreshed to show the new assistant-originated dialog representation 120(4) (i.e., "Now playing "Crazy" starring Waylon Payne"). This is shown at the instance of time $T_3$ in FIG. 9. In essence, the conversation is now restarted at this point and the remaining dialog representations are removed.

Figure 10:
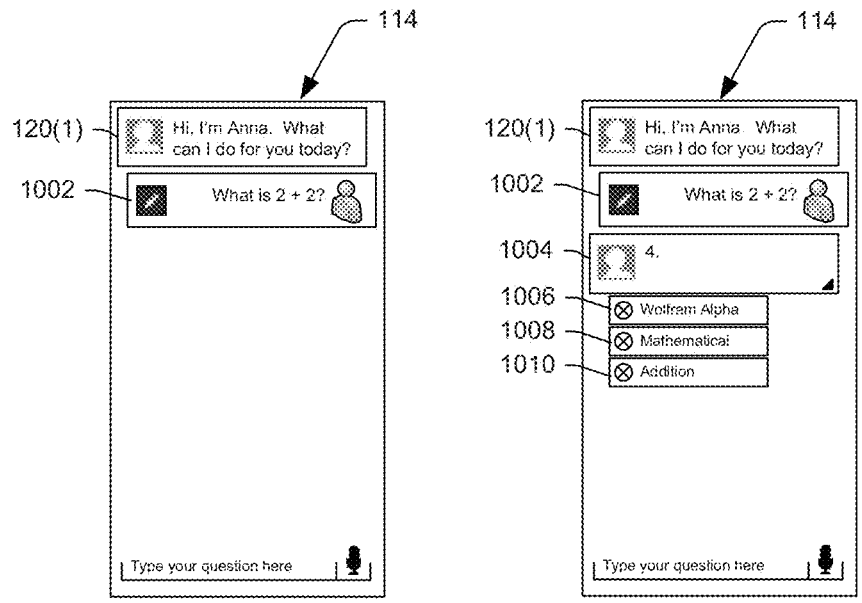
FIG. 10 shows a sequence of instances of the conversation GUI to illustrate another implementation of presenting assumptions and clarifications to the user.
Figure 10:
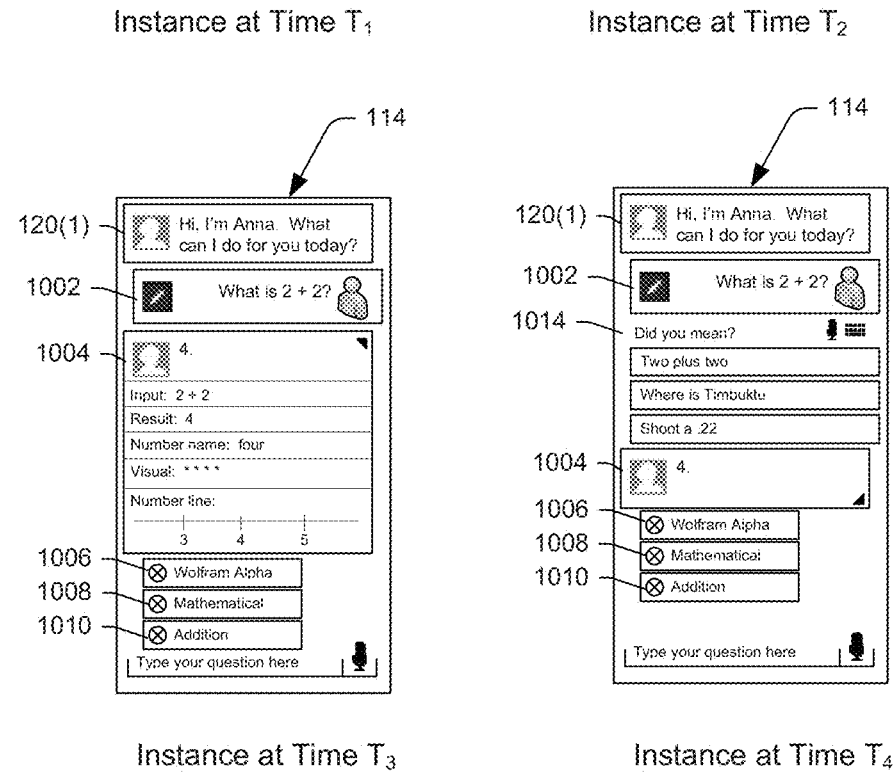

FIG. 10 shows a sequence of instances of the conversation GUI 114 to illustrate another implementation of presenting assumptions to the user. This example implementation is described using a scenario in which the user inputs a seemingly simple math problem. At the instance of time T1, the user enters what is presented as "What is 2+2?" in the user-originated dialog representation 1002. The user may have typed in this entry, which would remove some recognition problems, or may have entered this by voice, which might introduce some issues with speech recognition. Suppose it was the latter.

The virtual assistant service 116 processes the input and produces a best response of "4", the answer to the math problem of "2+2". The response is displayed in the assistant-originated dialog representation 1004 in the conversation GUI 114 at an instance of time $T_2$. Along with the response are one or more assumptions made by variable-response module 126 of the virtual assistant service 116 in determining a response of "4". These assumptions are exhibited as graphical boxes 1006, 1008, and 1010. The first assumption 1006 indicates that the variable-response module 126 used a mathematical search engine from "Wolfgram Alpha". The assumptions 1008 and 1010 indicate that the variable-response module 126 employed two specific models for interpretation, including a mathematical model and an addition model, respectively. If the user disagrees that these models should be used in the interpretation, the user can remove them by selecting the remove control (e.g., encircled "x" symbol) associated with each graphical box The conversation GUI 114 taken at an instance at time $T_3$ shows the dialog representation 1004 in more detail. This additional detail is revealed in response to the user's selection of the expand control in the representation 1004.

The conversation GUI 114 taken at an instance at time $T_4$ shows a set of assumptions 1012 that were used in deciding whether the user's speech input was accurately received and recognized. In this example, the clarification elements attempt to clarify whether the user's verbal input was, as interpreted, a math problem of 2+2, or a request for information on the African city of "Timbuktu", or whether the user was referring to shooting a type of rifle. The user may select any one of these clarification elements to change the input, causing the virtual assistant service 116 to prepare a different response.

The scenarios and sample GUI arrangements are merely examples. In each example, the conversation GUI attempts to graphically and visually represent not only the dialog between the virtual assistant and the user, but the assumptions used throughout the conversation. The user may reveal the assumptions and better glean why the conversation progressed the way it did. The user may also restart the conversation at any time, and at any point in the current conversation. Similar to how a human functions in a conversation, the GUI 114 provides the dialog as well as the reasoning and logic hints underlying the assumptions that formed the dialog. This intuitive GUI allows the user to very quickly grasp any issues and correct them. Through this GUI 114, the user believes that he is conversing with the virtual assistant and merely clarifying his remarks, rather than being left with a feeling that the system did not get it, or missed it, which is more common in traditional limited, single question/answer computer interaction experiences.

Figure 11A:
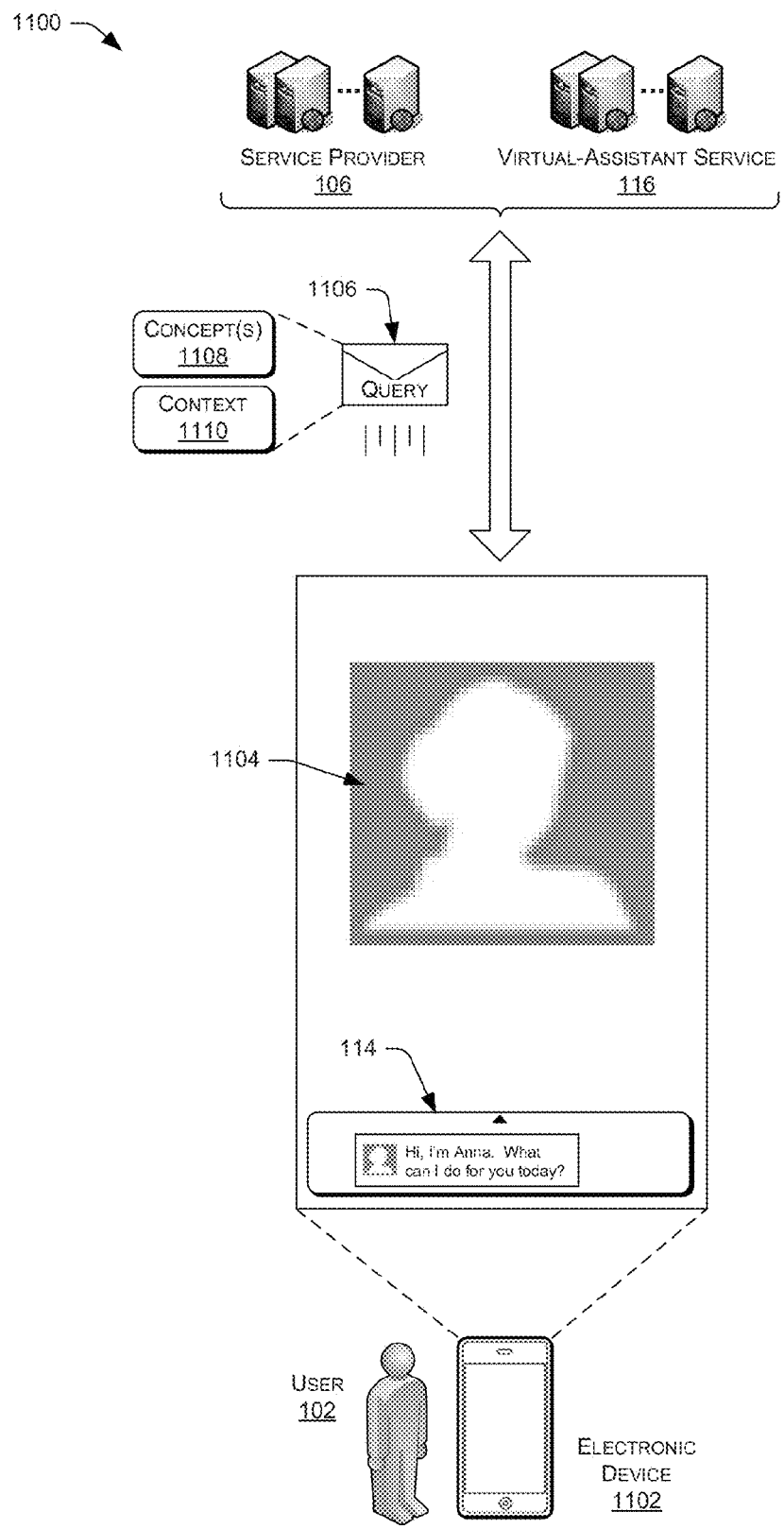
FIGS. 11A-B collectively illustrate an implementation involving a mobile electronic device and show a high-level communication flow between a mobile electronic device and the service provider and/or the virtual-assistant service.
Figure 11B:
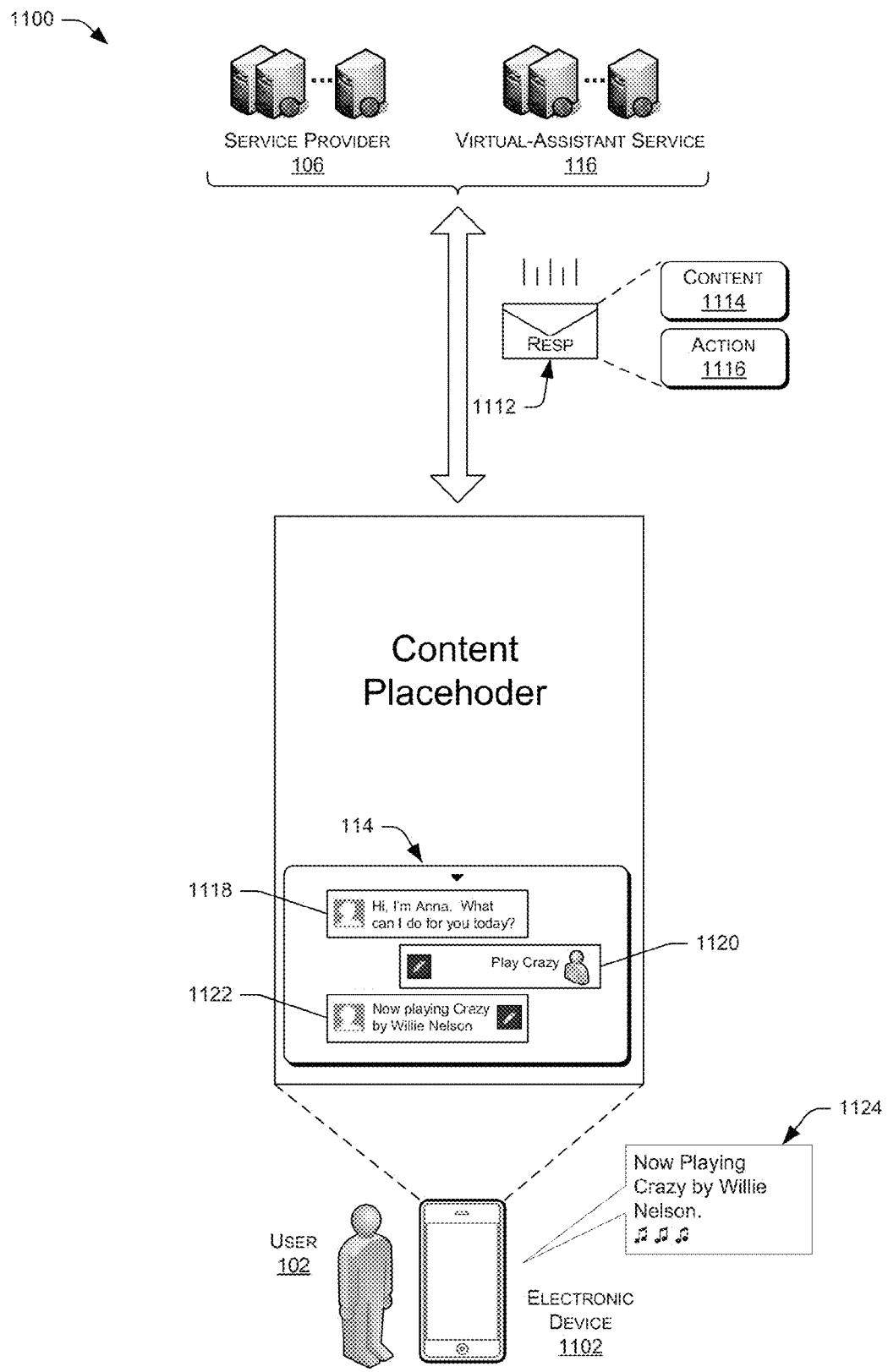

FIGS. 11A-B collectively illustrate another implementation 1100 involving a mobile electronic device 1102, and show a high-level communication flow between the mobile electronic device 1102 of the user 102 and the service provider 106 and/or the virtual-assistant service 116. As shown in FIG. 11A, the virtual assistant 1104 is the main, and perhaps only, persona on the initial UI of the mobile device 1102. The virtual assistant 1104 may be part of the operating system of the mobile device 1102 to give the device a personality. Alternatively, the virtual assistant may be an application that is stored and executed on the mobile device 1102. The conversation GUI 114 may be provided initially at the lower portion of the display area. Suppose the user 102 provides a query 1106 via the virtual assistant, with the query including one or more concepts 1108 and one or more pieces of context 1110.

FIG. 11B illustrates that, upon receiving the query, the service provider 106 and/or the virtual-assistant service 116 may determine a suitable response 1112 to provide to the user 102. Again, this response may be determined by identifying an intent of the query 1106 with reference to the concepts 1108 and one or more pieces of the context 1110, and then by mapping the determined intent along with one or more same or different pieces of the context 1110 to produce the response 1112.

The response 1112 may comprise content 1114 and/or an action 1116. The response content 1114 may be presented to the user via the conversation GUI 114 and/or audibly output by the mobile device 1102. In FIG. 11B, the conversation GUI 114 shows three dialog representations: the welcome dialog 1118 from the virtual assistant, the user input 1120 (e.g., Play Crazy), and the response 1122 from the virtual assistant (e.g., "Now playing Crazy by Willie Nelson). The GUI 114 functions similarly to that described above with respect to FIGS. 2-10.

Example Virtual-Assistant Service

Figure 12:
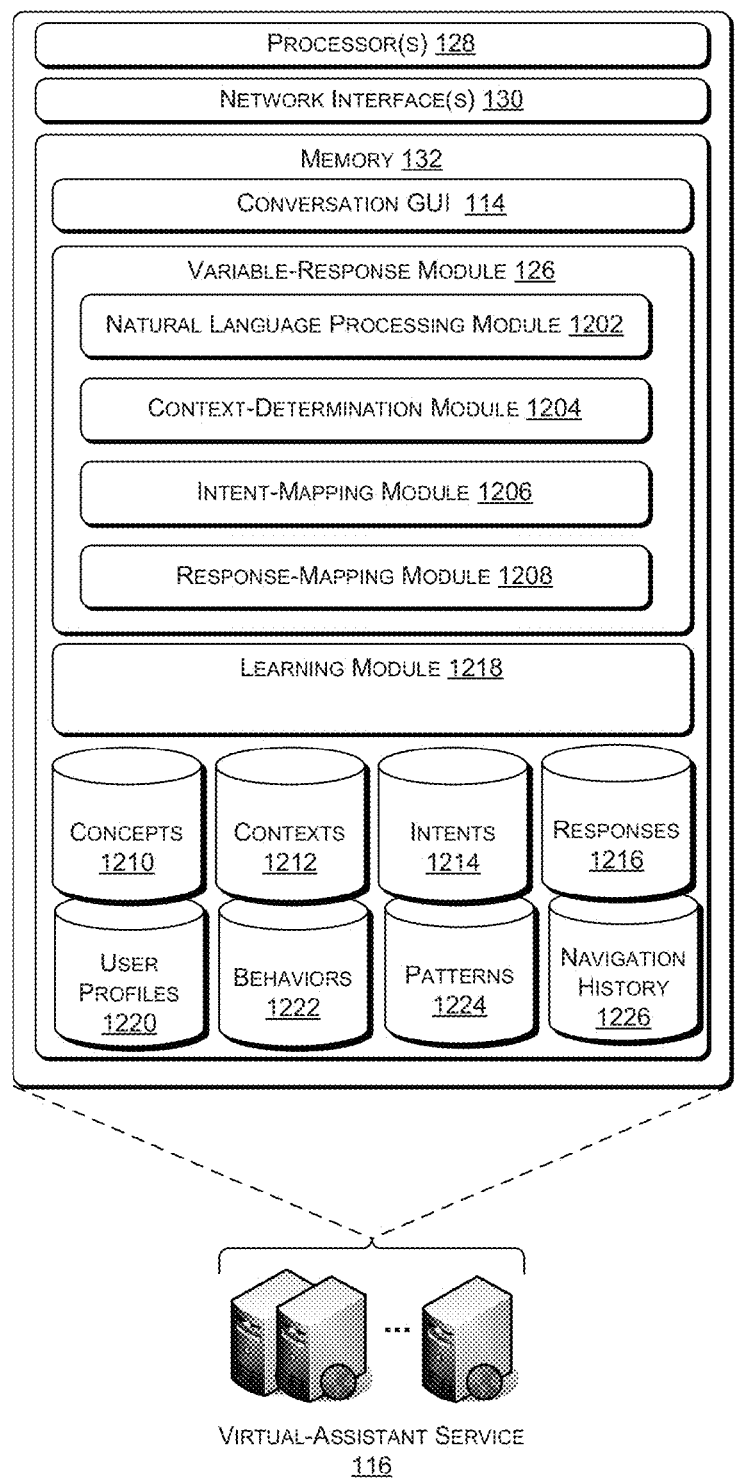
FIG. 12 illustrates example components that the virtual-assistant service of FIG. 1 may utilize when determining a response to the user input.

FIG. 12 illustrates example components that the virtual-assistant service 116 may utilize when determining a response to the user's input. As illustrated, the service 116 may be hosted on one or more servers that include one or more processors 128, one or more network interfaces 130, and memory 132.

The memory 132 may store or otherwise have access to the conversation GUI 114 and the variable-response module 126. The variable-response module 126 may include a natural language processing module 1202, a context-determination module 1204, an intent-mapping module 1206, and a response-mapping module 1208. In addition, the memory 132 may also store or otherwise have access to a datastore of one or more concepts 1210, a datastore of one or more contexts 1212, a datastore of one or more intents 1214, and a datastore of one or more responses 1216.

The natural language processing module 1202 may implement known or new natural language processing techniques to parse a received query for the purpose of identifying one or more concepts expressed therein. For instance, the module 1202 may identify a set of concepts 1210 based on the string of text of the query. The context-determination module 1204, meanwhile, may function to identify one or more pieces of context associated with the received query, such as whether the user is signed in, a geolocation of the user when issuing the query, or the like. The intent-mapping module 1206 may then map the identified set of concepts and the identified pieces of context to one of the multiple different intents 1214. That is, given the union of a particular concept set and respective values of one or more variables associated with the context of the query, the module 1206 may map the query to a particular intent of the intents 1214.

Finally, the response-mapping module 1208 may map the intent to a particular response based at least in part on respective values of one or more variables, which may be the same or different variables used when mapping the query to an intent. Stated otherwise, and as illustrated below with reference to FIG. 13, each intent of the intents 1214 may be associated with multiple different responses. Therefore, after a particular query has been mapped to a particular intent, the response-mapping module 1208 may identify which of the multiple responses associated with the intent to provide to the user who provided the query, with reference to the context of the query.

The virtual assistant service 116 may further implement a learning module 1218, which is shown stored in the memory 132 for executing on the processor(s) 128. The learning module 1216 observes user activity and attempts to learn characteristics about the user that can be used as input to the variable-response module 126. The learning module 1208 may initially access a user profile store 1220 to find any preferences that the user may have provided. Then, overtime, the learning module 1218 may learn any number of characteristics about the user, such as behaviors (e.g., listens to music in the morning and watches movies at night, or speaks with an accent that might impact language models, or prefers own music collection rather than looking for new music in the cloud, etc.). The user behaviors are stored in a behavior store 1222. The learning module 1218 may also track patterns (e.g., user normally reads the news starting with the sports, followed by the business section, followed by the world news). Patterns may be kept in the patterns store 1224. The learning module 1218 may also monitor navigation history, which is maintained in the store 1226. Each of these observed behaviors, patterns, and navigation history may be useful to the variable-response module 126 by providing additional context to the user input.

As an example of the learning, consider the scenario above where the user incorrectly entered "Cobo" or the speech recognition system incorrectly recognized the user input as "Cobo". Once the user corrects this to say "Cabo", the learning module 1218 can record this correction from "Cobo" to "Cabo" in the event that a similar situation arises in the future. Thus, when the user next spoke the phrase "Cabo San Lucas", and even though the speech recognition might recognize the user input as "Cobo", the virtual assistant service 116 will use the learned correction and make a new assumption that the user means "Cabo" and respond accordingly. As another example, if the user routinely asks for movie "Crazy", the learning module 1218 will learn, over time, that this is the user preference and make this assumption. Hence, in the future, when the user says "Play Crazy", the virtual assistant service 116 will make a different initial assumption to begin play of the movie, rather than the original assumption of the song "Crazy" by Willie Nelson.

While FIG. 12 illustrates the described components as residing on the virtual-assistant service 116, in other instances some or all of these components may reside in another location. For instance, these components may reside across the service 116, the service provider 106, the electronic device 104 or 1202, or at any other location.

Figure 13:
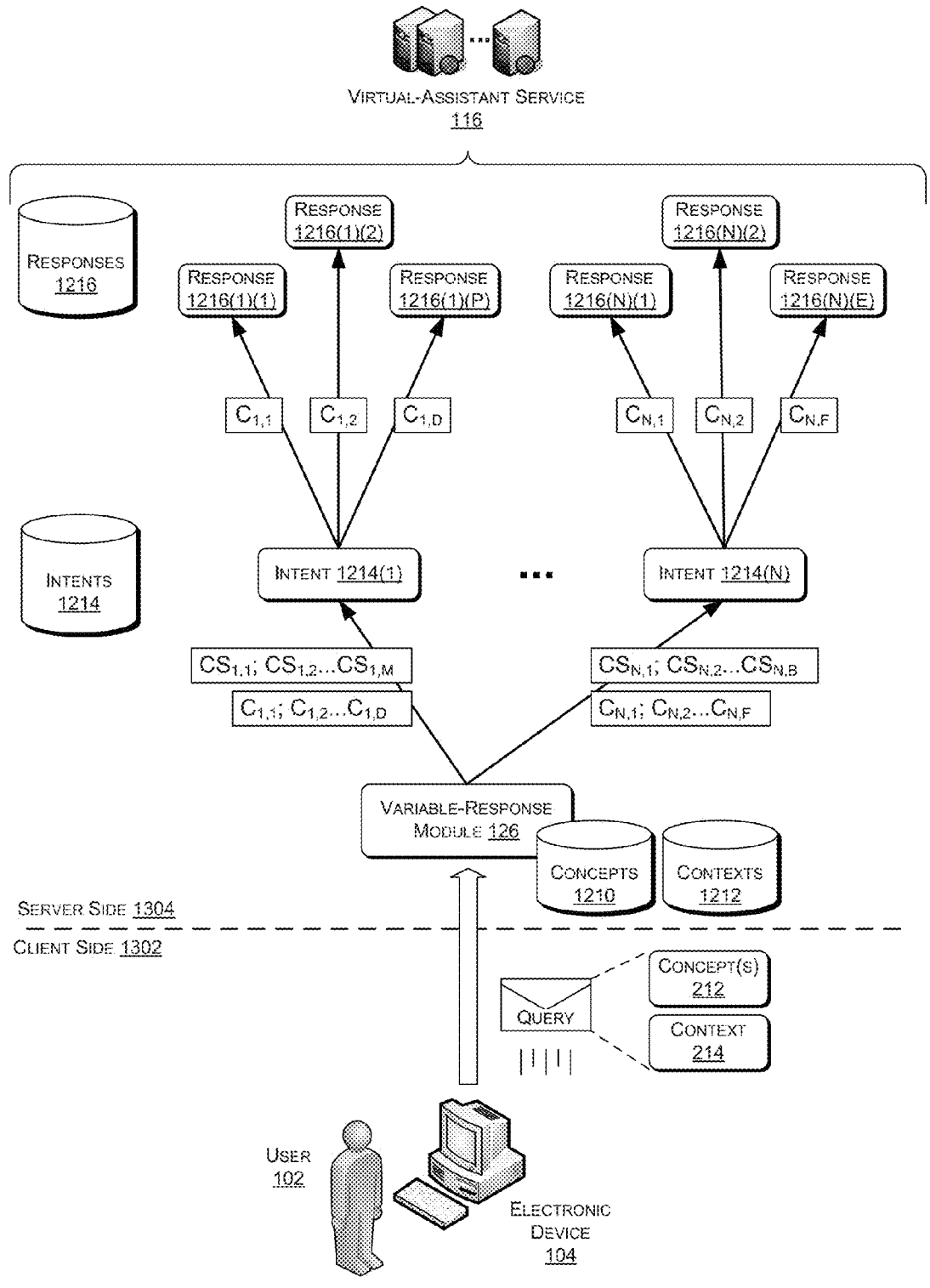
FIG. 13 illustrates how the virtual-assistant service may determine a response to provide to a user in response to receiving the user input. As illustrated, the service may first map the user input to a particular intent with reference to both concepts expressed in the input and a context associated with the input. After mapping the input to an intent, the service may then map the intent to an appropriate response with reference to the context of the input.

FIG. 13 illustrates how the virtual-assistant service 116 may determine a response to provide to the example user 102 upon receiving a query from the user 102 via the conversation GUI 114. In this example, the query is provided from the user on a lower or client side 1302 of the illustration, while the determining of a response to provide to the query is illustrated as being performed on a top or server side 1304 of the illustration. Of course, in other implementations, different portions of the operations may be performed at other locations.

As FIG. 13 depicts, the example query again includes strings of words or phrases from which one or more concepts 212 can be derived, and one or more pieces of context 214. Upon receiving the query, the variable-response module 126 may identify, potentially with reference to the datastores 1210 and 1212, the concepts and context of the query. Based on the identified set of concepts of the query (or "concept set") and the identified pieces of context of the query (or "context"), the module 126 may map the query to one of multiple different intents 1214(1), . . . , 1214(N). For instance, FIG. 13 illustrates that a query having a concept set "$CS_{1,1}$" and a context "$C_{1,1}$," maps to the intent 1214(1), while a query having a concept set "$CS_{N,1}$" and a context "$C_{N,1}$" maps to the intent 1214(N). In some instances, a concept set may map to more than one intent and, therefore, the context of the query may be used to determine which intent to map the query to. That is, in instances where a concept set of a query maps to multiple different intents, the intents may compete for the query based on the context of the query. As used herein, a letter (e.g., "N", "E", etc.) represents any integer that is greater than zero.

The learning module 1218 may provide input for use in mapping the concepts and context to different intents. For instance, the learning module 1218 may over time learn diction or expressions of a user (e.g., when the user says "peaches", she means "happiness"). The learning module 1218 may also learn behavior or patterns or other characteristics that may impact the mapping to intents. For instance, if the user typically requests country western music in the morning and movies in the evening, the phrase "Play Crazy" from the user in the morning might map to action to play the song "Crazy", whereas this same phase from the user after dinner may be interpreted as a desire to watch the movie "Crazy". Accordingly, context, concepts, and learned characteristics may all play a roll, together or individually, in mapping user input to intents.

After mapping the query to an intent, the variable-response module 126 may then map the intent to an appropriate response 1216(1)(1), . . . , 1216(N)(E) with reference to the context of the query. For instance, for a query that the module 126 has mapped to the intent 1214(1) and that has a context "$C_{1,1}$,", the module 126 maps this query to a response 1216(1)(1). In some instances, of course, a response may be common (or utilized) across multiple different intents. After determining the response based on the context, the virtual-assistant service 116 may then provide this response to the user 102, such as directly to the device 104 or to the service provider 106 for providing to the device 104 (and/or to another device associated with the user).

Throughout the process, the responses are thus based on assumptions surrounding correct recognition of the input, derivation of concepts, understanding context, mapping to intents, and mapping to responses. Several responses may be generated by the variable-response module 126. From these responses, the module 126 evaluates which is the most appropriate. This may be based on a cumulative confidence value or some other mechanism.

Example Processes

Figure 14A:
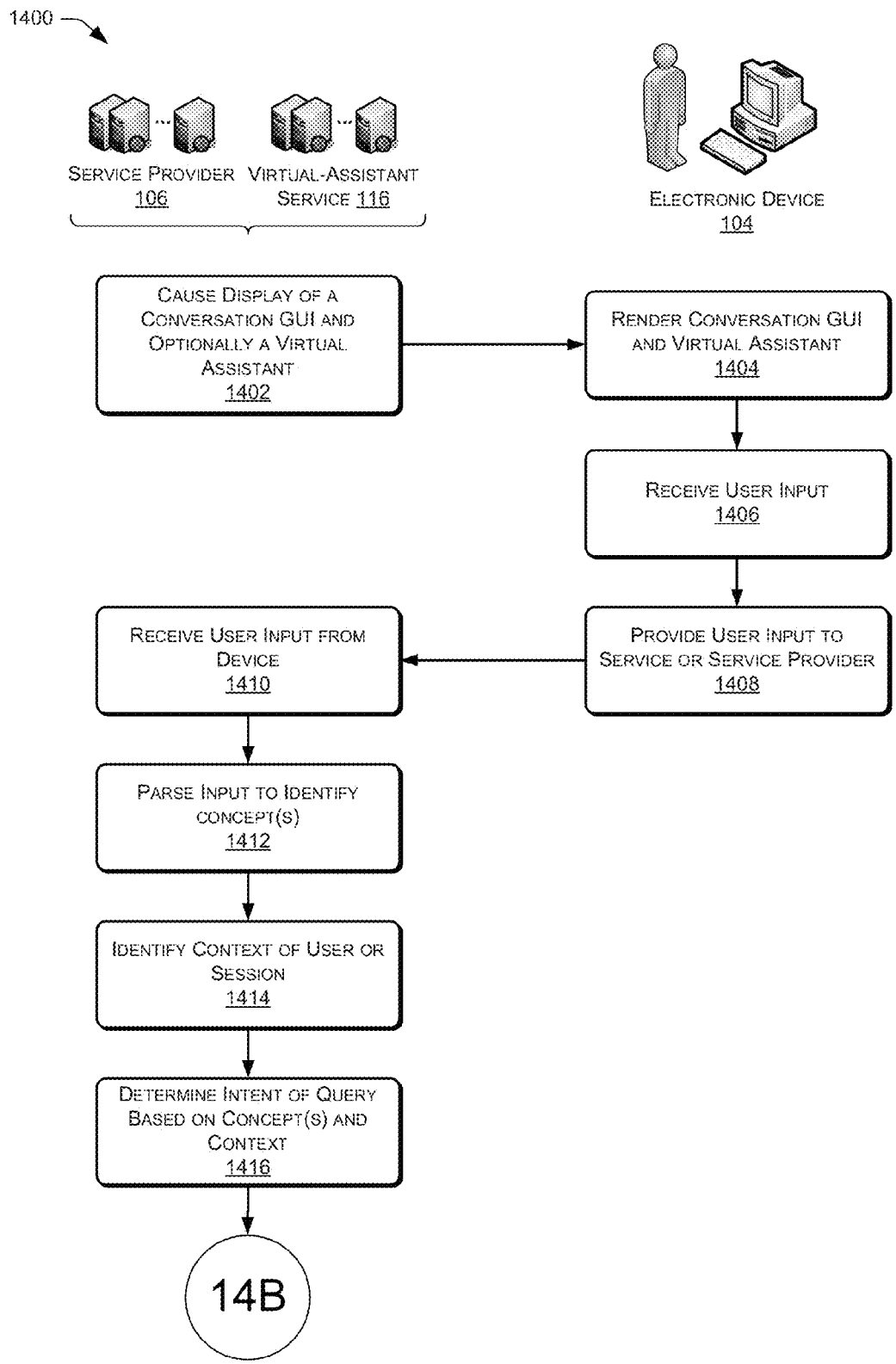
FIGS. 14A-B collectively illustrate an example process that includes the example user providing a query via the conversation GUI and the service provider and/or the virtual-assistant service determining a response to provide to the user.
Figure 14B:
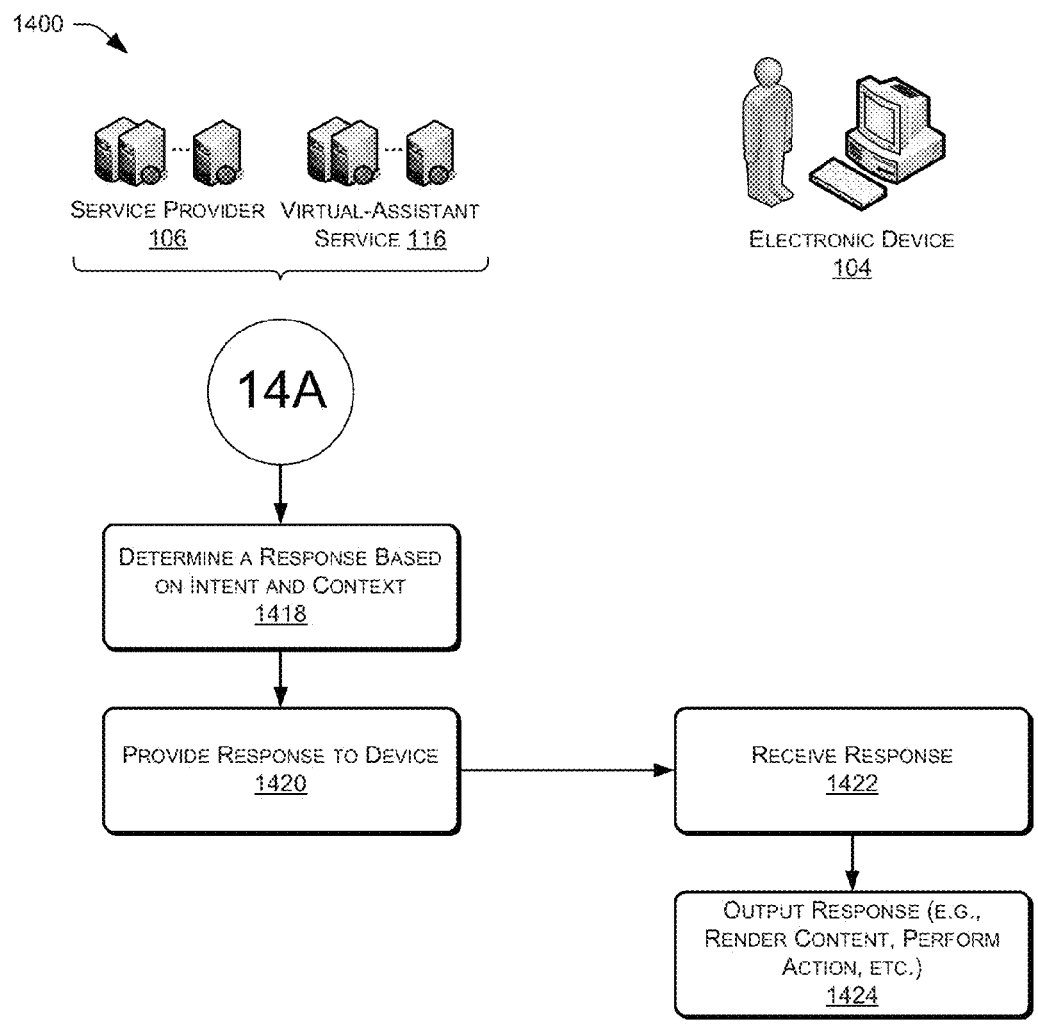

FIGS. 14A-B collectively illustrate an example process 1400 that includes the example user 102 providing a query via the conversation GUI 114 and the service provider 106 and/or the virtual-assistant service 116 determining a response to provide to the user 102. Consistent with the discussion above, this response may take a context of the query into account both when identifying an intent of the query and when identifying an appropriate response. In this example, operations illustrated beneath the electronic device 104 may be performed by this device in some examples, while operations illustrated beneath the provider 106 and the service 116 may be performed by the provider and/or the service in some examples. However, it is to be appreciated that in other implementations the operations may be performed at any other location(s).

The process 1400 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 1402, the service provider 106 and/or the virtual-assistant service 116 causes display of the conversation GUI on the user device 102. The conversation GUI may be the sole graphics on the screen, or it may on or adjacent to site content from a service provider.

At 1404, and in response, the device 104 renders the conversation GUI 114. At 1406, the device 104 receives input from the user, which may comprise a string of text, verbal input, or some other input (e.g., gesture, video images, etc.). At 1408, the device 104 provides the input to the provider 106 and/or the service 116, which receives the input at 1410.

At 1412, the provider 106 and/or the service 116 parses the user input to identify one or more concepts expressed therein. That is, the provider 106 and/or the service 116 may use natural language processing techniques to identify concepts specified by the user in the query. These concepts may be determined with reference to contents of the user's query in any suitable manner. In some examples, the concept(s) of a query are determined at least partly with reference to one or more keywords expressed within the query. For instance, the concepts may be determined using relatively basic keyword matching in some instances. This matching can be improved with the learning module 1218, so that specific words or phrases can be mapped to a given concept based on learned specific user behavior. In other instances, meanwhile, the concepts may be determined using a much richer process as described below.

In these instances, when the provider 106 and/or the service 116 receives the query in the form of a string of text, the provider 106 and/or the service 116 preprocesses the string by, for example, identifying one or more tokens within the string. The tokens may comprise words, phrases, symbols, or the like that signify some sort of meaning within the query. After tokenizing the string of text, the provider 106 and/or the service 116 may then map each of these tokens and/or ordered patterns of the tokens to a more general set, known as a "vocab item". A vocab item may comprise a general set of multiple different tokens having a meaning that is common amongst these tokens. For instance, the tokens "happy", "elated" and a smiley face (e.g., ":-)") may each map to a vocabulary item representing "happiness". User specific learning via the learning module 1218 can produce tokens like "peaches", where the user always uses this word to mean "happiness".

After mapping tokens and/or patterns of tokens from the original string of text to one or more vocab items, the provider 106 and/or the service 116 may then pattern match the vocab items to one or more concepts. That is, each concept may be associated with multiple different vocab-item patterns (e.g., "(vocab item A, vocab item D, vocab item F)", "(vocab item B, vocab item E)", "(vocab item X)", etc.). In addition, some of these patterns may be associated with a context. For instance, the pattern "(vocab item B, vocab item E)" may map to a particular concept given a particular context (e.g., the user is a Gold Member), but not otherwise. By pattern matching the vocab items to the concepts, the provider 106 and/or the service 116 may identify one or more concepts that are associated with the submitted query. Key phrases can also be learned or matched to a concept. For example, a user may use the phrase "put up wet" which the learning module 1218 learns that the user means being overworked, so the system maps this phrase to the concept of overworked.

In addition or in the alternative to the techniques described above, the provider 106 and/or the service 116 may identify concept(s) of a query with reference to a graph data structure that maintains correlations between words. The graph data structure, for instance, may maintain a hierarchy of words (e.g., hypernyms and hyponyms). The techniques may utilize this hierarchy to identify one or more concepts within a string of text. For instance, if a string contains the word "cookbook", the techniques may analyze the graph data structure to determine that "cookbook" is a type of a "reference book" which is a type of "book". The techniques may then identify "book", "reference book", and/or "book" as a concept within the query. Of course, in this and other processes used to determine concepts within queries, the techniques may reference other factors associated with the queries, such as the ordering of words, parts of speech of words, and the like. Furthermore, while a few different example techniques for identifying concepts have been described, it is to be appreciated that other new and/or known techniques may be used to identify concepts within a query.

At 1414, the provider 106 and/or the service 116 may also identify a context associated with the user 102 or with a session of the user 102 on the site of the service provider 106. This may include whether the user is logged in on the site, a page from which the user submitted the query, a status of the user at the service provider 106, a day of week or time of day, or the like. At 1416, the provider 106 and/or the service 116 determine an intent of the query based on the identified concept(s) and the identified context.

FIG. 14B continues the illustration of the process 1400 and includes, at 1418, the provider 106 and/or the service 116 determining a response to provide to the user input based on the intent and the identified context. In some instances, the portion of the context referenced in mapping the query to the intent represents the same portion of context referenced in mapping the intent to the response. In other instances, meanwhile, the provider 106 and/or the service 116 map the query to an intent using a first portion of context, while using a second, different portion of the context when mapping the intent to the response. Of course, in still other instances, these portions of content may include at least one common piece of context and at least one piece of context that is not commonly used.

At 1420, the provider 106 and/or the service 116 provides the response to the electronic device 104 of the user or to another electronic device associated with the user. In this example, the device 104 receives the response at 1422 and, at 1424, outputs the response to the user 102 as part of the conversation GUI 114. For instance, the device 104 may render text, one or more links, audible content, and the like, and may perform one or more actions specified in the response.

Figure 15:
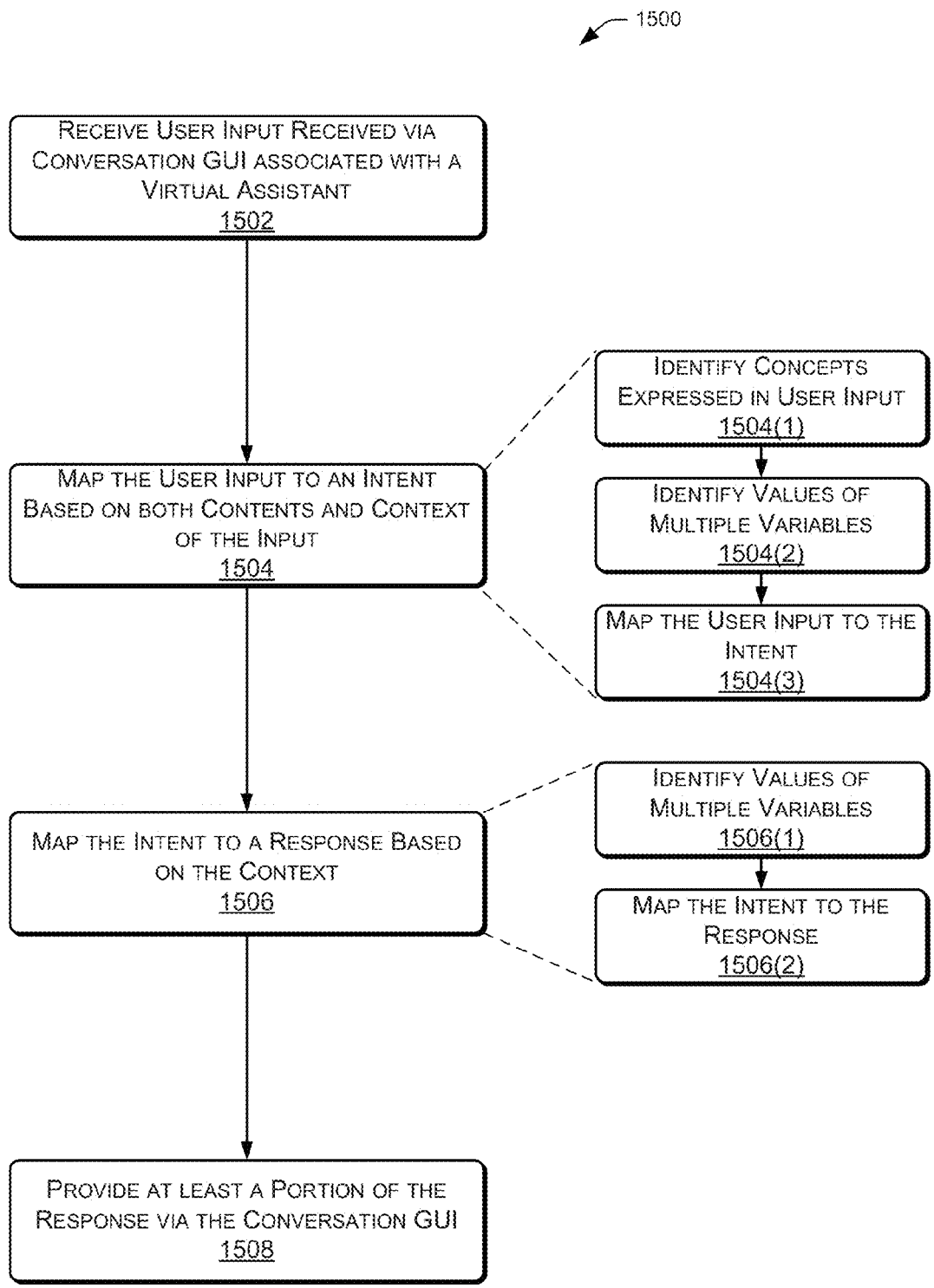
FIG. 15 is a flow diagram illustrating an example process for providing variable responses to user queries via virtual assistants.

FIG. 15 illustrates another process 1500 for providing variable responses to user queries via virtual assistants. This process may be performed by the virtual-assistant service 116, the service provider 106, the electronic device 104 of the user, and/or some combination thereof. At 1502, the process 1500 receives user input entered by the user via the conversation GUI 114 associated with a virtual assistant. At 1504, the process 1500 maps the user input to an intent based on both contents of the query and a context of the query.

In some instances, the operation 1504 may comprise a series of sub-operations. At 1504(1), the process 1500 identifies one or more concepts expressed in the query. At 1504(2), the process identifies respective values of multiple different variables that may collectively define the context of the query. Finally, at 1504(3), the process 1500 maps the user input to the intent with reference to the concepts and the values of the multiple variables.

At 1506, the process 1500 maps the intent to a response based on the context of the user input. The operation 1506 may include a series of sub-operations that include, at 1506(1), the process 1500 identifying values of multiple variables, which may be the same and/or different from the variables used in mapping the input to the intent at 1504(3). At 1506(2), the process 1500 then maps the intent to the response based at least in part on the values of the variables identified at 1506(1). Finally, at 1508, the process 1500 may provide at least a portion of the response to the user via the virtual assistant.

Figure 16:
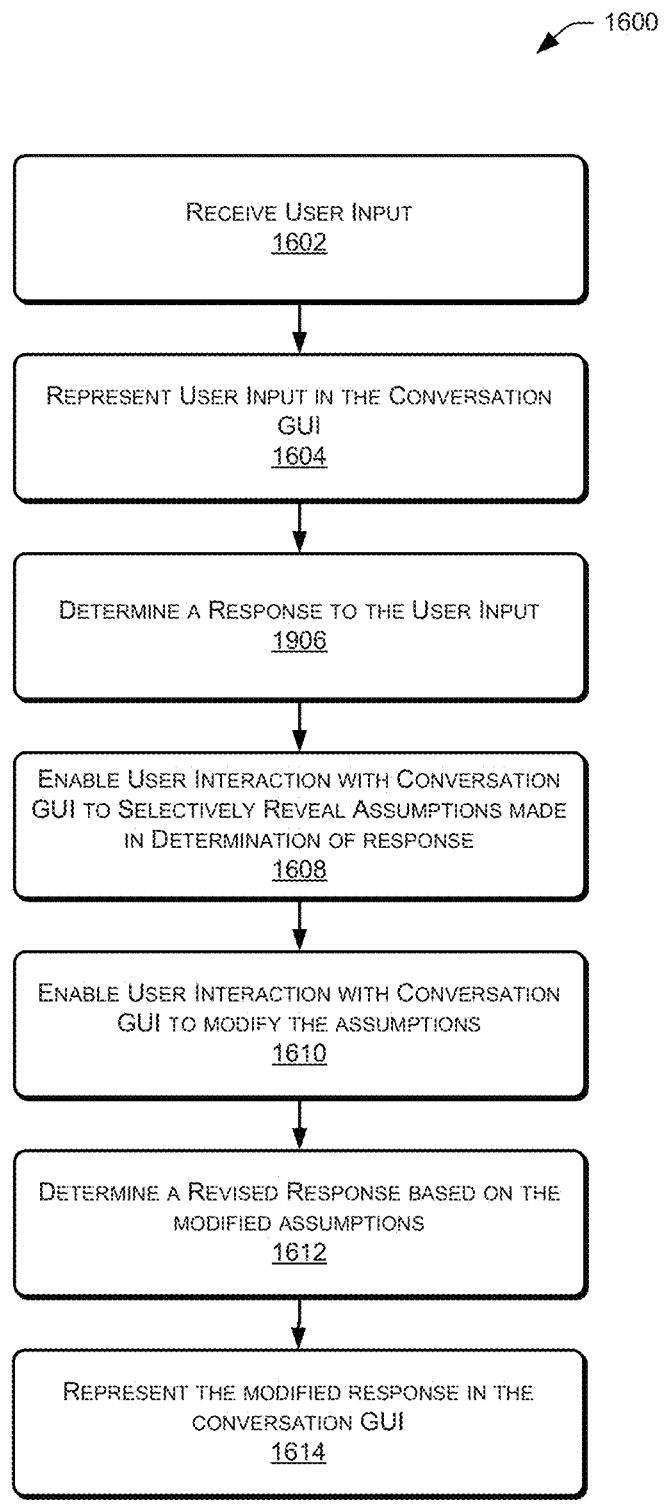
FIG. 16 is a flow diagram that illustrates an example process for facilitating conversation via a graphical user interface (GUI).

FIG. 16 illustrates an example process 1600 for facilitating conversation via a graphical user interface (GUI). This process 1600 may be performed by the electronic device 104 of the user during the session.

At 1602, user input is received at the user device 104. At 1604, the user input is represented in the conversation GUI 114, such as in a graphical dialog bubble 122. At 1606, a response to the user input is determined. This may be done by variable-response module 126 (whether residing on the virtual assistant service 116 or at the user computing device 104).

At 1608, the process 1600 enables user interaction via the conversation GUI to selectively reveal the one or more assumptions that were made to determine the response. At 1610, the process 1600 further enables user interaction via the conversation GUI to modify one or more of the assumptions. At 1612, a revised response is determined based on the modified assumption(s). At 1614, the revised response is represented in the conversation GUI 114.

Figure 17:
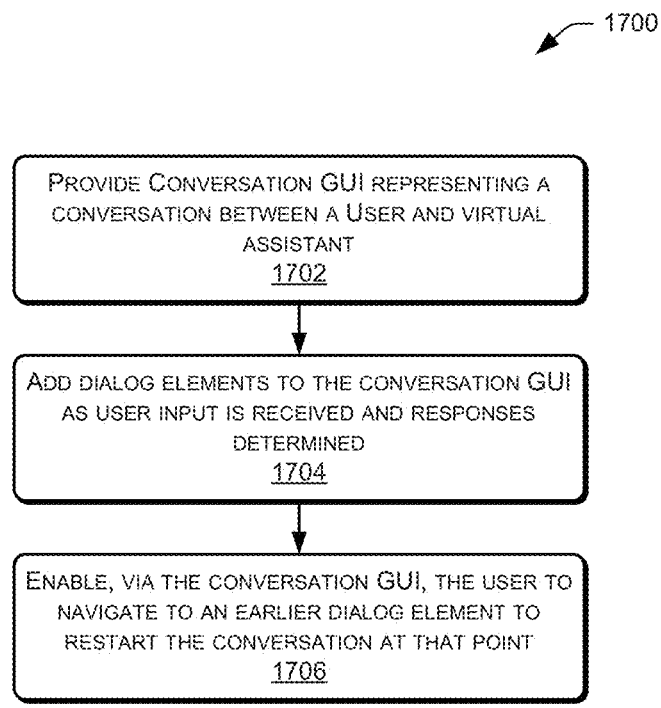
FIG. 17 is a flow diagram that shows an example process for facilitating conversation via a graphical user interface (GUI).

FIG. 17 illustrates an example process 1700 for facilitating conversation via a graphical user interface (GUI). This process 1700 may be performed by the electronic device 104 of the user during the session. At 1702, the conversation GUI 114 is provided for display on the user device 104. The conversation GUI represents a conversation between the user and a virtual assistant.

At 1704, dialog elements are added to the conversation GUI as user provides input and the virtual assistant determines responses thereto. The dialog elements may be graphically represented as dialog bubbles with text of the conversation. The dialog elements are added sequentially in a dialog panel, so that elements at the top occurred earlier in the conversation than elements at the bottom.

At 1706, the process 1700 enables the user to navigate to an earlier dialog element in the conversation GUI to restart the conversation. For example, the user may return to an earlier dialog element, modify assumptions, and the resulting conversation takes a different path from that point forward.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media storing computer-executable instructions that, when executed on one or more processors, cause the one or more processors of a virtual assistant service to perform acts comprising:
   generating data for a conversation graphical user interface (GUI) that represents a virtual assistant;
   causing display of the conversation GUI via a computing device to enable a conversation between the virtual assistant and a user of the computing device;
   receiving user input that is provided via the conversation GUI, the user input comprising one of audio input, keypad input, or touch input;
   parsing the user input with a natural language processing system that employs a language model;
   determining, with the natural language processing system, a response based at least in part on (i) the parsed user input and (ii) at least one of content of a service provider, content of the virtual assistant service, or content of the computing device of the user;
   identifying an assumption that is used to determine the response, the assumption comprising at least one of the language model that is employed by the natural language processing system, a profile for the user, or a learned behavior of the user;
   causing display of a dialog representation in the conversation GUI for the user input;
   causing display of a dialog representation in the conversation GUI for the response;
   causing display of the assumption in the conversation GUI;
   enabling the user to interact with the conversation GUI to modify the assumption;
   receiving a modification to the assumption;
   determining a revised response based at least in part on the modification to the assumption; and
   causing display of the revised response in the conversation GUI.

2. One or more non-transitory computer-readable media as recited in claim 1, wherein the user input is the audio input, and the user input is represented in the conversation GUI in a text format.

3. One or more non-transitory computer-readable media as recited in claim 1, wherein the user input is the audio input, and the determining a response comprises a combination of interpreting the audio input and ascertaining a suitable response for the audio input as interpreted.

4. One or more non-transitory computer-readable media as recited in claim 3, wherein the assumption further includes an assumption pertaining to interpretation of the audio input.

5. One or more non-transitory computer-readable media as recited in claim 1, wherein the acts further comprise learning, from past user behavior, what assumptions should be used in making the determination of the response.

6. One or more non-transitory computer-readable media as recited in claim 1, wherein the acts further comprise identifying a context associated with the user or associated with a session of the user on a site, wherein the assumption used to determine the response is set, at least in part, by the context.

7. One or more non-transitory computer-readable media as recited in claim 1, wherein the acts further comprise recording modifications made by the user to the assumption and learning from the user modifications to adjust how the determination of the response to a future user input is made.

8. One or more non-transitory computer-readable media as recited in claim 1, wherein the acts further comprise enabling the user to interact with the conversation GUI to select a prior dialog bubble and start a new conversation from the prior dialog bubble.

9. One or more non-transitory computer-readable media as recited in claim 1, wherein the acts further comprise
   identifying one or more concepts expressed in the user input;
   identifying a context associated with the user or associated with a session of the user on a site; and
   determining an intent of the user input based at least in part on the one or more concepts and the context; and
   wherein the response is determined based at least in part on the intent and the context.

10. One or more non-transitory computer-readable media as recited in claim 9, wherein the user input comprises a string of text, and the identifying of the one or more concepts comprises identifying one or more keywords within the string of text and mapping the one or more keywords to the one or more concepts.

11. One or more non-transitory computer-readable media as recited in claim 9, wherein the user input comprises a string of text, and the identifying of the one or more concepts comprises:
    identifying one or more tokens within the string of text;
    mapping the one or more tokens to one or more vocab items; and
    pattern matching the one or more vocab items to the one or more concepts.

12. One or more non-transitory computer-readable media as recited in claim 9, wherein the determining of the intent comprises mapping the one or more concepts to one of multiple different intents associated with the one or more concepts based at least in part on the context.

13. One or more non-transitory computer-readable media as recited in claim 9, wherein the determining of the response comprises mapping the intent to one of multiple different responses associated with the intent based at least in part on the context.

14. One or more non-transitory computer-readable media as recited in claim 9, wherein the intent is identified with reference to at least a first portion of the context and the response is identified with reference to at least a second, different portion of the context.

15. One or more non-transitory computer-readable media as recited in claim 9, wherein the context comprises:
    whether or not the user has signed in with the site of the service provider;
    a status of the user with the service provider;
    a page of the site from which the user provides the user input to the virtual assistant;
    how long the user has remained on the page of the site from which the user provides the user input to the virtual assistant;
    a navigation history of the user during the session prior to the user providing the user input to the virtual assistant;
    a location of a cursor when the user provides the user input to the virtual assistant;

a prior query provided by the user to the virtual assistant during the session or during a prior session with the site;
a time of day at which the user provides the user input to the virtual assistant;
a date on which the user provides the user input to the virtual assistant;
an age of the user;
a location of the user;
a device type from which the user accesses the site;
a language of the user;
user preferences;
user buying patterns;
past user behavior; or
a previous interaction between the user and the virtual assistant.

16. One or more non-transitory computer-readable media as recited in claim 9, wherein the acts further comprise causing an action on behalf of the user, the action comprising one of:
purchasing an item on behalf of the user;
initiating a request on behalf of the user;
initiating a communication on behalf of the user;
communication to others on behalf of the user; or
altering a reservation or order on behalf of the user.

17. One or more non-transitory computer-readable media as recited in claim 9, wherein the acts further comprise learning over time that certain words of the user input map to certain vocabulary terms.

18. One or more non-transitory computer-readable media as recited in claim 9, wherein the acts further comprise learning over time that certain phrases of the user input map to corresponding concepts.

19. A portable computing device comprising:
one or more non-transitory computer-readable media as recited in claim 1; and
one or more processors to execute the computer-executable instructions stored on the computer-readable media to perform the acts.

20. A computing system comprising:
one or more servers for hosting a site;
the one or more non-transitory computer-readable media as recited in claim 1; and
one or more processors to execute the computer-executable instructions stored on the computer-readable media to perform the acts.

21. One or more non-transitory computer-readable media storing computer-executable instructions that, when executed on one or more processors, cause the one or more processors to perform acts comprising:
parsing user input with natural language processing techniques that utilize a language model, the user input comprising at least one of gesture input, audio input, keypad input, or touch input;
determining a response based at least in part on the parsed user input;
causing display of a conversation user interface having a first dialog representation associated with the user input and a second dialog representation associated with the response, the conversation user interface being associated with a virtual assistant;
providing, for display as part of the conversation user interface, one or more graphical elements to convey at least one assumption made to interpret the user input and determine the response; and
enabling, via the conversation user interface, a user to change the assumption, whereupon change of the assumption causes the second dialog representation associated with the response to be removed and a third dialog representation to be displayed, the third dialog representation representing an updated response for the virtual assistant.

22. One or more non-transitory computer-readable media as recited in claim 21, wherein the assumption comprises a speech recognition assumption that pertains to recognizing verbal input from the user.

23. One or more non-transitory computer-readable media as recited in claim 21, wherein the assumption comprises a logic assumption that pertains to determining the response to the user input.

24. One or more non-transitory computer-readable media as recited in claim 21, wherein the assumption comprises one or more assistant-initiated clarifications that ask the user to clarify the user input.

25. One or more non-transitory computer-readable media as recited in claim 21, wherein one or more assumptions are associated with each of the first and second dialog representations.

26. One or more non-transitory computer-readable media as recited in claim 21, wherein the one or more graphical elements that convey associated assumptions are initially hidden in the conversation user interface, the first and second dialog representations being independently selectable via the conversation user interface to reveal the one or more graphical elements in association with a corresponding first or second dialog representation.

27. One or more non-transitory computer-readable media as recited in claim 21, wherein the user has a user profile, and the acts further comprise determining the assumption made to interpret the user input based at least in part on the user profile.

28. One or more non-transitory computer-readable media as recited in claim 21, wherein the acts further comprise determining the assumption made to interpret the user input based at least in part on the user profile.

29. One or more non-transitory computer-readable media as recited in claim 21, wherein the acts further comprise determining the assumption made to interpret the user input based at least in part a context associated with the user.

30. One or more non-transitory computer-readable media as recited in claim 21, wherein the acts further comprise learning characteristics of the user, and determining the assumption made to interpret the user input based at least in part these learned characteristics.

31. One or more non-transitory computer-readable media as recited in claim 30, wherein the characteristics of the user comprises one or more of speech features, preferences, behaviors, patterns, and navigation history.

32. One or more non-transitory computer-readable media as recited in claim 21, wherein the acts further comprise enabling removal of one or more of the first or second dialog representations from the conversation user interface.

33. One or more non-transitory computer-readable media as recited in claim 21, wherein the acts further comprise audibly outputting the response.

34. One or more non-transitory computer-readable media as recited in claim 21, wherein the acts further comprise:
identifying one or more concepts expressed in the user input;
identifying a context associated with the user or associated with a session of the user on a site; and
determining an intent of the user input based at least in part on the one or more concepts and the context; and
wherein the response to the user input is determined based at least in part on the intent and the context.

35. A portable computing device comprising:
one or more non-transitory computer-readable media as recited in claim 21; and
one or more processors to execute the computer-executable instructions stored on the computer-readable media to perform the acts.

36. One or more non-transitory computer-readable media storing computer-executable instructions that, when executed on one or more processors, cause the one or more processors to perform acts comprising:
causing display of a conversation user interface that represents a conversation between a user and a virtual assistant;
parsing, based at least in part on natural language processing techniques that employ a language model, input from the user that is received during the conversation between the user and the virtual assistant, the input from the user comprising at least one of gesture input, audio input, keypad input, or touch input;
determining a response for the virtual assistant based at least in part on the parsed input;
adding, for display in the conversation user interface, a first dialog representation associated with the input from the user and a second dialog representation associated with the response from the virtual assistant to visually convey the conversation; and
enabling, via interaction with the conversation user interface, the user to select a particular one of the first or second dialog representations within the conversation user interface and restart the conversation from the particular one of the first or second dialog representations, the restarting including removing the particular one of the first or second dialog representations and displaying a third dialog representation associated with an updated response from the virtual assistant.

37. A portable computing device comprising:
one or more non-transitory computer-readable media as recited in claim 36; and
one or more processors to execute the computer-executable instructions stored on the one or more non-transitory computer-readable media to perform the acts.

38. A computing device, comprising:
a memory;
at least one processor;
a display;
a communication module stored in the memory and executed by the at least one processor to:
send input from a user of the computing device to be parsed by a natural language processing system that employs a language model, the input including at least one of audio or text; and
receive from the natural language processing system a response to the input from the user; and
a conversation application stored in the memory and executed by the at least one processor to facilitate a conversation with the user of the computing device, the conversation application providing a conversation graphical user interface (GUI) to be displayed on the display, the conversation GUI comprising:
an entry portion to receive, from the user, the input;
an area to visually convey the conversation, the area to present a user dialog representation associated with the input from the user and a device dialog representation associated with the response to the input from the user; and
a control associated with at least one of the user or a device dialog representation to visually change, upon actuation, the conversation GUI to reveal an assumption that was used to determine the response, the assumption comprising at least one of a value obtained from the conversation, a value that is external to the conversation, or a value that is obtained from a previous conversation with the user.

39. The computing device of claim 38, embodied as a portable communication device.

40. A method comprising:
under control of one or more computing devices configured to implement a virtual assistant,
parsing user input with a natural language processing system that employs a language model, the user input comprising at least one of gesture input, audio input, keypad input, or touch input;
representing the user input in a conversation user interface;
determining, with the natural language processing system, a response to the user input;
representing the response to the user input in the conversation user interface;
enabling a user to interact with the conversation user interface to ascertain how the response was determined and to modify assumptions used to determine the response, wherein modification of one or more assumptions results in a modified response, and wherein individual assumptions comprise at least one of a value obtained via the conversation user interface, a value that is external to the conversation user interface, or a value that is obtained from a previous conversation between the user and the virtual assistant; and
representing the modified response in the conversation user interface.

41. A method of claim 40, wherein the representing the user input and representing the response comprises graphically presenting a series of dialog bubbles that visually distinguish between the user input and the response.

42. A method of claim 40, wherein the enabling comprises providing a control to reveal, upon actuation, how the response to the user input was determined.

43. A method of claim 40, further comprising learning characteristics of the user and choosing the assumptions used to determine the response from the characteristics.

44. A method of claim 43, wherein the characteristics of the user comprises one or more of speech features, preferences, behaviors, patterns, and navigation history.

45. One or more non-transitory computer-readable media storing computer-executable instructions that, when executed on one or more processors, cause the one or more processors to perform acts comprising:
parsing input from a user with natural language processing techniques that utilize a language model, the input from the user comprising at least one of gesture input, audio input, keypad input, or touch input;
determining a response to the input from the user based at least in part on the parsed input;
serving or rendering a conversation graphical user interface (GUI), the conversation GUI comprising:
an entry portion to receive, from the user, the input;
an area to visually convey a conversation, the area to present a user dialog representation associated with the input received from the user and a device dialog representation associated with the response to the input from the user; and
a control associated with at least one of the user or device dialog representation to visually change, upon actuation, the conversation GUI to reveal an assumption that was used to determine the response, the assumption comprising at least one of a value obtained from the conversation, a value that is external to the conversation, or a value that is obtained from a previous conversation with the user.

46. One or more non-transitory computer-readable media as recited in claim 45, wherein the response was determined based on learned characteristics of the user.

47. One or more non-transitory computer-readable media as recited in claim 46, wherein the characteristics of the user comprises one or more of speech features, preferences, behaviors, patterns, and navigation history.

* * * * *